(12) United States Patent
Lessing et al.

(10) Patent No.: US 10,118,301 B2
(45) Date of Patent: Nov. 6, 2018

(54) SOFT ROBOTIC ACTUATOR ATTACHMENT HUB AND GRASPER ASSEMBLY, REINFORCED ACTUATORS, AND ELECTROADHESIVE ACTUATORS

(71) Applicant: Soft Robotics, Inc., Cambridge, MA (US)

(72) Inventors: Joshua Aaron Lessing, Cambridge, MA (US); Ryan Richard Knopf, Cambridge, MA (US); Carl Everett Vause, Concord, MA (US); Kevin Alcedo, Coral Springs, FL (US)

(73) Assignee: SOFT ROBOTICS, INC., Cambridge, MA (US)

( * ) Notice: Subject to any disclaimer, the term of this patent is extended or adjusted under 35 U.S.C. 154(b) by 178 days.

(21) Appl. No.: 14/857,648

(22) Filed: Sep. 17, 2015

(65) Prior Publication Data
US 2016/0075036 A1    Mar. 17, 2016

Related U.S. Application Data

(60) Provisional application No. 62/051,571, filed on Sep. 17, 2014, provisional application No. 62/051,546, filed on Sep. 17, 2014.

(51) Int. Cl.
*B25J 15/12* (2006.01)
*B25J 15/06* (2006.01)
(Continued)

(52) U.S. Cl.
CPC .......... *B25J 15/12* (2013.01); *B25J 15/0085* (2013.01); *B25J 15/0608* (2013.01); *B25J 15/10* (2013.01); *B25J 19/02* (2013.01)

(58) Field of Classification Search
CPC .... B25J 15/12; B25J 15/0085; B25J 15/0608; B25J 15/0023; B25J 15/0408
See application file for complete search history.

(56) References Cited

U.S. PATENT DOCUMENTS

| | | | |
|---|---|---|---|
| 3,144,947 A | 8/1964 | Pittwood | |
| 3,343,864 A * | 9/1967 | Baer | B25J 15/0009 294/119.3 |

(Continued)

FOREIGN PATENT DOCUMENTS

| | | |
|---|---|---|
| EP | 0534778 A2 | 3/1993 |
| JP | 2008012667 A | 1/2008 |

(Continued)

OTHER PUBLICATIONS

International Search Report and Written Opinion of PCT/US2015/050793; dated Jan. 29, 2016, 9 pages.

*Primary Examiner* — Scott Bauer

(57) ABSTRACT

A hub assembly for coupling different grasper assemblies including a soft actuator in various configurations to a mechanical robotic components are described. Further described are soft actuators having various reinforcement. Further described are and soft actuators having electroadhesive pads for improved grip, and/or embedded electromagnets for interacting with complementary surfaces on the object being gripped. Still further described are soft actuators having reinforcement mechanisms for reducing or eliminating bowing in a strain limiting layer, or for reinforcing accordion troughs in the soft actuator body.

9 Claims, 30 Drawing Sheets

(51) Int. Cl.
*B25J 15/00* (2006.01)
*B25J 15/10* (2006.01)
*B25J 19/02* (2006.01)

(56) References Cited

U.S. PATENT DOCUMENTS

| | | | |
|---|---|---|---|
| 3,601,442 A * | 8/1971 | Orndorff | B25J 15/0023 |
| | | | 294/119.3 |
| 4,114,464 A | 9/1978 | Schubert et al. | |
| 4,636,135 A * | 1/1987 | Bancon | B25J 15/0491 |
| | | | 29/26 A |
| 5,317,956 A | 6/1994 | Devenish | |
| 5,385,080 A * | 1/1995 | Suzumori | B25J 15/12 |
| | | | 91/525 |
| 5,568,957 A * | 10/1996 | Haugs | B25J 15/12 |
| | | | 294/119.3 |
| 6,484,601 B1 | 11/2002 | Arrichiello | |
| 6,846,029 B1 | 1/2005 | Ragner et al. | |
| 7,794,171 B2 * | 9/2010 | Park | B25J 3/04 |
| | | | 403/349 |
| 8,251,420 B2 | 8/2012 | Mizuno et al. | |
| 9,144,909 B2 * | 9/2015 | DeLouis | B25J 15/04 |
| 9,718,195 B1 | 8/2017 | Youmans | |
| 2003/0032855 A1 | 2/2003 | Shahinpoor | |
| 2004/0103740 A1 | 6/2004 | Townsend et al. | |
| 2004/0199206 A1 | 10/2004 | Muramatsu | |
| 2005/0218679 A1 | 10/2005 | Yokoyama et al. | |
| 2007/0144299 A1 | 6/2007 | Okazaki | |
| 2009/0044655 A1 | 2/2009 | DeLouis et al. | |
| 2011/0136376 A1 * | 6/2011 | Johnson | A61F 2/76 |
| | | | 439/529 |
| 2011/0148132 A1 | 6/2011 | Park et al. | |
| 2011/0193362 A1 * | 8/2011 | Prahlad | B25J 15/00 |
| | | | 294/81.2 |
| 2012/0267055 A1 | 10/2012 | Rogalla et al. | |
| 2013/0149079 A1 | 3/2013 | Ohiso et al. | |
| 2015/0151433 A1 | 6/2015 | Rust et al. | |
| 2015/0360372 A1 * | 12/2015 | Schiettecatte | B25J 9/0015 |
| | | | 294/197 |
| 2016/0075036 A1 | 3/2016 | Lessing et al. | |
| 2017/0036355 A1 | 2/2017 | Lessing et al. | |

FOREIGN PATENT DOCUMENTS

| | | |
|---|---|---|
| JP | 2012055999 A | 3/2012 |
| JP | 2013519532 A | 5/2013 |
| WO | 2004000508 A1 | 12/2003 |
| WO | 2013088733 A1 | 6/2013 |
| WO | 2014138123 A1 | 9/2014 |

* cited by examiner

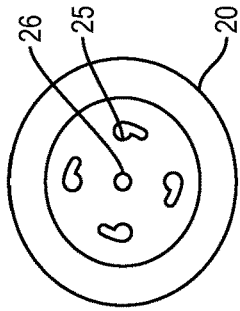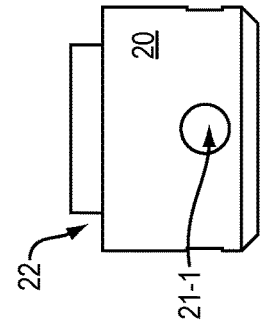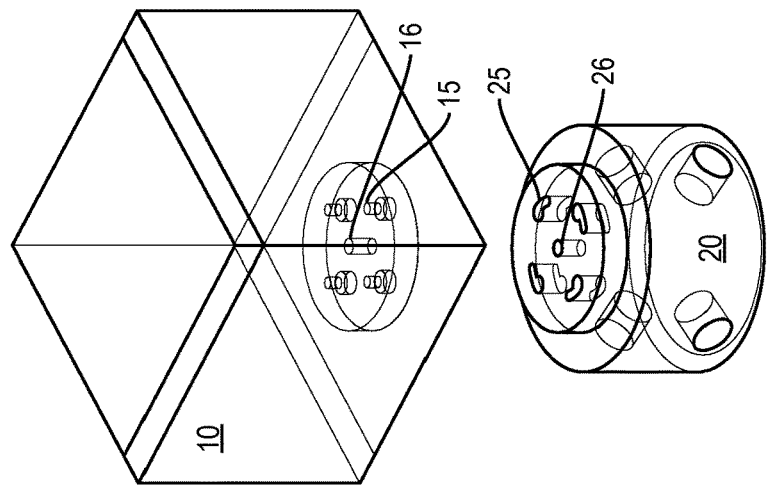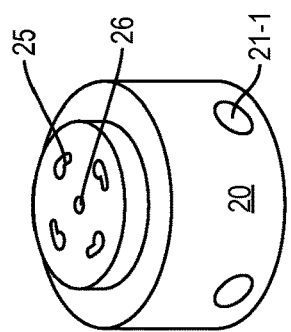

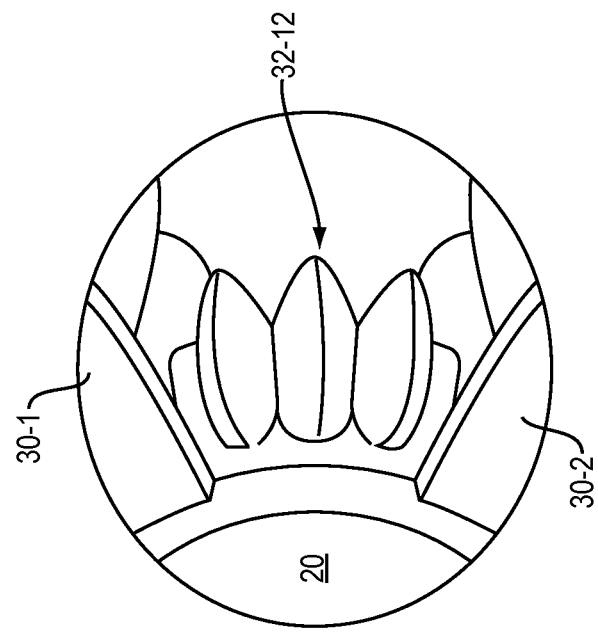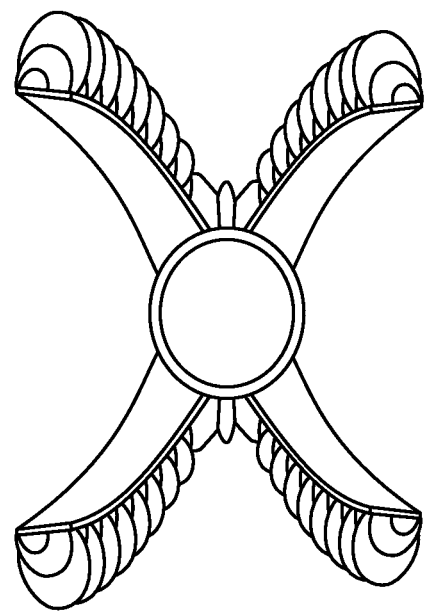
FIG. 11B

SOFT ROBOTIC ACTUATOR ATTACHMENT HUB AND GRASPER ASSEMBLY, REINFORCED ACTUATORS, AND ELECTROADHESIVE ACTUATORS

RELATED APPLICATIONS

The present application claims priority to U.S. Patent Application Ser. Nos. 62/051,546 and 62/051,571, both filed on Sep. 17, 2015. The contents of the aforementioned applications are incorporated herein by reference. Moreover, various soft robotic technologies are discussed in PCT International Publication Number WO2012/148472, which application is incorporated herein by reference in its entirety.

FIELD OF THE DISCLOSURE

The disclosure relates generally to the field of robotics and particularly to hubs and assemblies for interfacing soft robotic actuators with another mechanical system and to reinforced and/or electromagnetically augmented soft actuators.

BACKGROUND

Robotics are used in many industries, such as manufacturing, industrial applications, medical applications, and the like. Soft robotics is a developing area of robotics that provides soft, conformal, and adaptive graspers and actuators to enable robots to interact with objects in a similar manner to a human. In particular, such robots are able to manipulate objects in the same manner as a human hand. For example, if a part is on a shelf, a moving belt, or being moved from a shelf to a belt, an end effector may adapt to picking up the object from various directions, such as a "side pick" or a "top down pick." This same grasper may also adapt to varying objects in each task, just as the human hand can.

A magnetic assembly to combine "hard" and "soft" robotics has been disclosed in *A Hybrid Combining Hard and Soft Robotics*, Stokes Adam A., Shepherd Robert F., Morin Stephen A., Ilievski Filip, and Whitesides George M., Soft Robotics. March 2014, 1(1): 70-74. doi:10.1089/soro.2013.0002, which article is incorporated herein by reference in its entirety. However, the proposed combination of hard and soft robotics does not provide the versatility necessary to operate similar to a human.

In particular, current end effectors have difficulty adapting to varying part location (e.g., on a shelf, on a conveyor belt, or the like). Additionally, current end effectors have difficulty adapting to varying part sizes and geometries. Still further, current end effectors need complex control systems to operate.

Furthermore, conventional soft robotic actuators are constructed from a single elastomeric material such as silicone elastomer. Some actuators incorporate elastomers of differing stiffness or wall thickness to accommodate a certain desired behavior. This layer of varying thickness or stiffness is sometimes referred to as a strain limiting layer. Some actuators use incorporated or coextruded fibrous materials in the elastomer body of the actuator itself. Such co-molded fibers are intended to improve resistance to puncture and strengthen the actuator. Some actuators use textile socks with slits to increase the operating pressure regime of an actuator.

However, all of these actuators have several limitations. In particular, actuators that use similar but stiffer elastomers to reinforce or restrain the actuator with thinned or thickened wall sections quickly become heavy and bulky because of the amount of excess material needed to achieve desired behaviors. This is because while stiffer, both materials are still elastomers of similar chemistries and can only achieve a very limited stiffness differential. In the case of silicones, whose stiffness is highly correlated with hardness, useful materials for soft actuators typically fall within the range of 10-80A Durometer yielding at most an 800% differential in stiffness between select regions of the actuator. This also means that when higher differentials in stiffness are achieved, it is mostly at the expense of strength in the weaker and softer elastomer regions.

Similarly, actuators that achieve higher function through reinforcement via thickened walls or slightly stiffer variants of elastomer are also limited to a select set of other equally important mechanical properties. As a result, these actuators can have poor mechanical damping characteristics, causing the actuator to appear floppy or poorly controlled. Additionally, such actuators can have limited resistance to tear or ablation compared to materials better suited to withstand puncture, acute damage, thermal shock, or general wear and fatigue. Furthermore, the load response of these construction materials is almost universally isotropic.

Actuators with fibrous reinforcements have been introduced by molding fibers into the actuator or co-extruded fibrous "pulp" as filler. Although such techniques provide slight improvements in puncture resistance and increased overall strength, this type of actuator precludes the possibility of modularity or repairs to such reinforcements without discarding the entire actuator. Additionally, fibrous reinforced actuators present a vulnerable rubbery surface to the environment, and issues of fiber delamination from the elastomer, limited fatigue life, and poor environmental resistance are prevalent.

The present disclosure is directed to the above limitations. In particular, the present disclosure provides improvements in interfacing hard and soft robotics and also provides improved actuators.

BRIEF DESCRIPTION OF THE DRAWINGS

FIGS. 4A-4D are perspective views illustrating an exemplary twist lock interface for the hub assembly of FIG. 1.

FIGS. 11A-11E are perspective views illustrating a grasper using the hub assembly of FIG. 1 and soft actuators having side actuators configured to change the angle of attack.

SUMMARY

Figure 1:
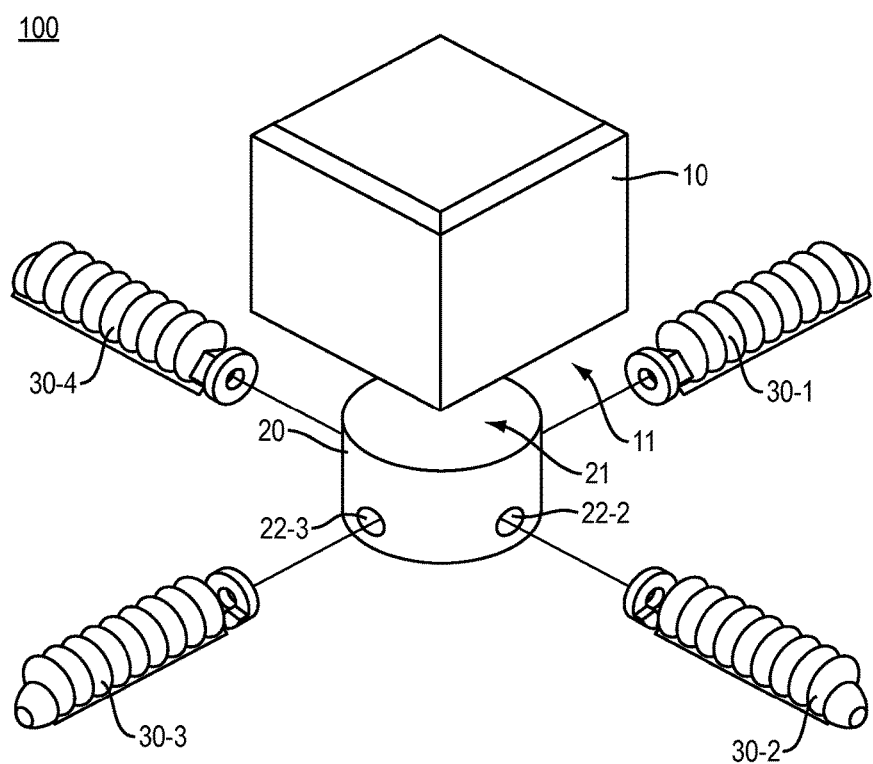
FIG. 1 is a perspective view illustrating an exemplary embodiment of a hub assembly and soft robotic actuators in accordance with various examples of the present disclosure.

"Soft robotic" actuators that are configured to perform new fundamental motions (e.g., bending, twisting, straightening, or the like) are described. Additionally, a hub and grasper assembly for such soft robotics actuators is described. Exemplary embodiments may employ soft robotic technologies in specific configurations that are useful as orthopedic devices, and related methods that employ such soft robotic configurations.

Some embodiments of the present disclosure describe a hub assembly capable of interfacing with various soft robotics actuators (e.g., Pneu-Net actuators, fiber reinforced actuators, soft tentacle actuators, accordion style actuators, or the like) and hard robotics (e.g., robotic arms, mechanical tools, or other mechanical systems).

Additionally, some embodiments of the present disclosure provide a grasper including elastomeric actuators. The grasper is conformal and adaptive to enable the handling of a range of items, with real-time adaption to the shape and size of the object.

Additionally, some embodiments of the present disclosure provide a reinforced actuator. In particular, an actuator with various geometries (e.g., unfolding accordion style actuator, or the like) and reinforced areas is provided. In some embodiments, soft actuators having reinforcement mechanisms for reducing or eliminating bowing in a strain limiting layer are provided.

According to some embodiments, the elastomeric or reinforced actuators may be provided with one or more embedded magnetic surfaces or electroadhesive pads. The magnetic surfaces may be configured to interface with a complementary surface on a gripped substrate. Regarding the electroadhesive pads, when placed in proximity to a substrate, electrostatic forces are created between the substrate and the electroadhesive pads. This allows for improved adhesion between the actuator and the material being gripped, where the adhesion can be readily activated or deactivated.

DETAILED DESCRIPTION OF THE PREFERRED EMBODIMENTS

The present invention will now be described more fully hereinafter with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

In accordance with the present disclosure, a hub and/or grasper assembly for interfacing soft robotic actuators with hard robotic assemblies is provided. Additionally, reinforced actuators are described. The reinforced actuators may be used with the hub and/or grasper assembly. However, for purposes of convenience, they are discussed separately. In particular, FIGS. 1-13 depict examples of a hub or grasper assembly according to embodiments of the present disclosure while FIGS. 14-27C depict examples of actuators according to embodiments of the present disclosure.

Referring to FIG. 1, an exemplary hub 100 in accordance with the present disclosure is shown. The hub 100 includes a master side assembly 10 and a tool side assembly 20. In general, the master side assembly 10 may be connected or connectable to a mechanical assembly, such as a robotic arm, a robotic manipulator, or in general any end effector of a robotic (e.g., hard robotics) assembly. The tool side assembly 20 may be configured to operably connect various soft actuators 30-*a* (where a is a positive integer). In particular, the tool side assembly 20 may be provided with actuator attachment portions 20-*b* (where be is a positive number). It is important to note, that the tools side assembly 20 may be configured connect any number of soft actuators 30-*a*. However, for convenience and clarity, a number of soft actuators 30-*a* (e.g., 30-1, 30-2, 30-3, and 30-4) and a number of actuator attachment portions 20-*a* (e.g., 20-1, 20-2, 20-3, and 20-4) are depicted in the figures. Additionally, it is important to note that the number of actuator attachment portions 20-*b* may be different than the number of actuators 30-*a* connected to the tool side assembly 20.

In general, each of the master side assembly 10 and the tool side assembly 20 include an interface configured to releaseably couple the assemblies 10 and 20 to each other. In particular, the tool side assembly 20 includes an interface portion 21 while the master side assembly includes an interface portion 11 (obscured by the angle of viewing). The interface portions 11 and 21 can be configured to couple the assemblies 10 and 20 and to provide a seal for inflation line (e.g., pneumatic, hydraulic, or the like) connections, electrical connections, or other connections.

Figure 2C:
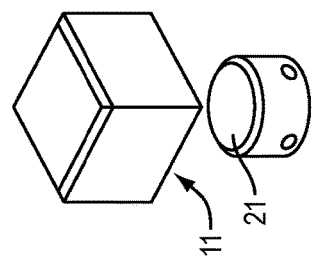
FIGS. 2A-2C are exploded views of the hub assembly of FIG. 1.
Figure 2A:
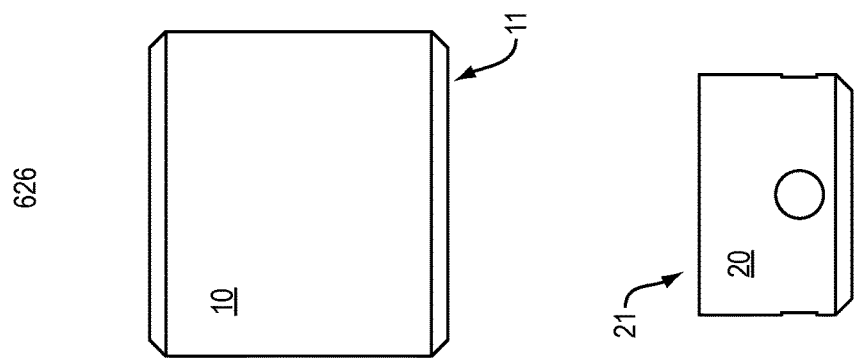
Figure 2B:
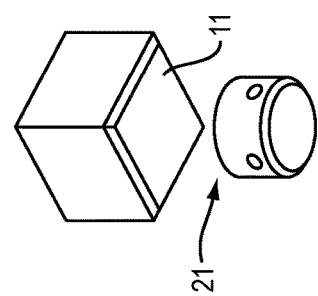

FIGS. 2A-2C depict an exploded view of the hub 100 from various perspectives. In particular, FIG. 2A illustrates the hub 100 from a straight on side view showing the master side assembly 10 and the tool side assembly 20. Furthermore, actuator attachment portion 22-1 is shown in the tool side assembly 20. Additionally, the interface portions 11 and 21 are shown. FIG. 2B illustrates the hub 100 from an angled bottom up perspective view showing the master side assembly 10 and the tool side assembly 20. Furthermore, actuator attachment portion 22-1 and 22-2 are shown in the tool side assembly 20. FIG. 2B illustrates the hub 100 from an angled bottom up perspective view showing the master side assembly 10 and the tool side assembly 20. Furthermore, actuator attachment portion 22-1 and 22-2 are shown in the tool side assembly 20. Additionally, the interface portions 11 and 21 are shown. FIG. 2C illustrates the hub 100 from an angled top down perspective view showing the master side assembly 10 and the tool side assembly 20. Furthermore, actuator attachment portion 22-1 and 22-2 are shown in the tool side assembly 20. Additionally, the interface portions 11 and 21 are shown.

It is to be appreciated, that areas of the interface portions 11 and 21 are merely depicted in FIG. 1 and FIGS. 2A-2C. However, it is to be appreciated, that the interface portions may have a variety of configurations and the interface portion should not be limited by that depicted in FIG. 1 and FIGS. 2A-2C.

Figure 3B:
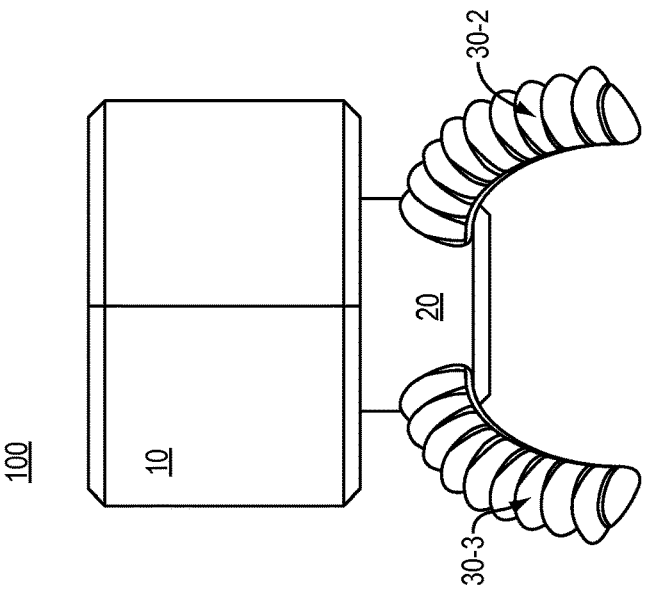
FIGS. 3A-3E are assembled views of the hub assembly and soft robotic actuators of FIG. 1.
Figure 3A:
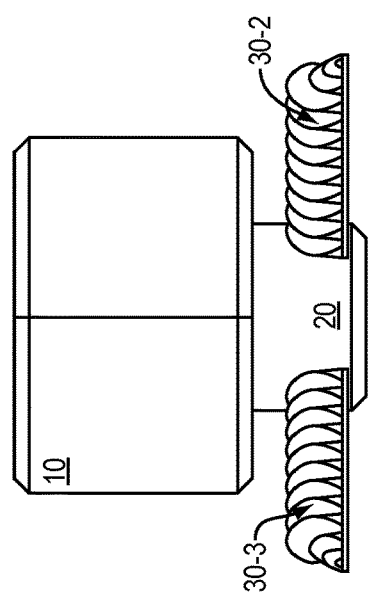
Figure 3E:
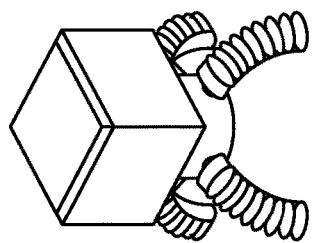
Figure 3C:
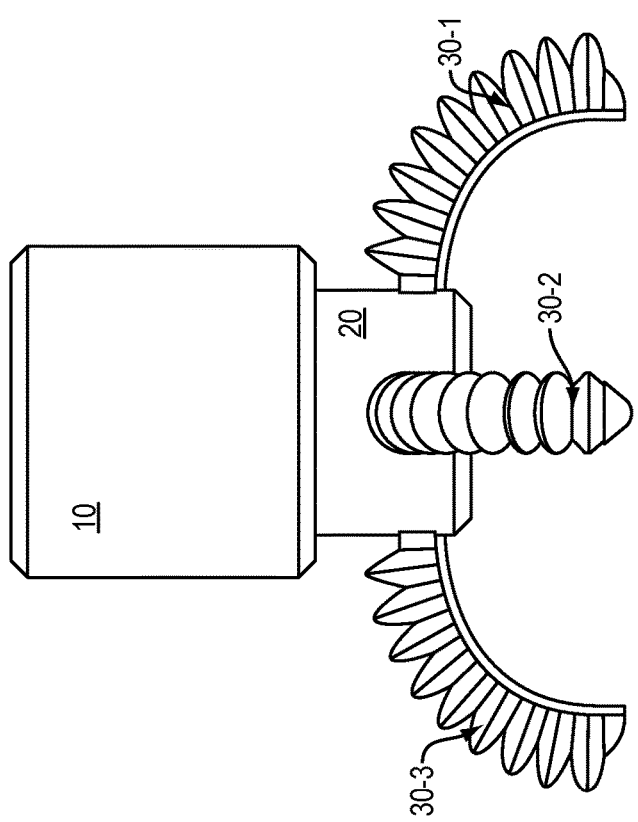
Figure 3D:
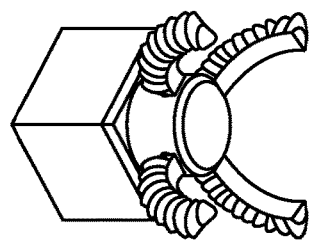

FIGS. 3A-3E depict an assembled view of the hub 100 and attached actuators 30 from various perspectives. In particular, FIG. 3A illustrates the hub 100 from a straight on side view showing the master side assembly 10 and the tool side assembly 20. Furthermore, actuators 30-2 and 30-3 are shown attached to the tool side assembly 20. Actuators 30-2 and 30-3 are depicted in a "neutral" position (e.g., not inflated, deflated, or the like). FIG. 3B illustrates the hub 100 from a straight on side view showing the master side assembly 10 and the tool side assembly 20 and the attached actuators 30-2 and 30-3 in an inflated state. FIG. 3C illustrates the hub 100 from an angled side view while FIGS. 3D and 3E show the hub 100 from an angled bottom up and tom down (respectively) perspective view. In particular, the assemblies 10 and 20 are shown coupled together with actuators 30-1, 30-2, 30-3, and 30-4 attached to the tool side assembly and depicted as inflated.

Accordingly, the hub assembly 100 can be used to quickly switch between various grasper assemblies by changing the tool side assembly 20. Example grasper assemblies are now described. It is important to note, that a system may be implemented with one master side assembly 10 and multiple the tool side assemblies 20 each with a different grasper configuration. As such, the system can be quickly reconfigured and used to perform different operations needing different graspers or soft actuators.

FIGS. 4A-4D depict an example of the hub assembly 100 including a twist lock interface. In particular, FIG. 4A illustrates an exploded top down perspective view of the hub assembly 100 showing the master side assembly 10 and the tool side assembly 20. Furthermore, actuator attachment portions (e.g., 22-1) are shown in the tool side assembly 20. Furthermore, details of the interface portions 11 and 21 are shown. In particular, the interface portion 11 includes pegs 15 and connection port 16 while the interface portion 21 includes slots 25 and connection port 26. The pegs and the slots are configured to be releaseably secured to each other. In particular, the slots 25 may have a varying diameter, where one end of each slot is proportioned to receive an end of a corresponding one of the pegs 15. Once the pegs 15 are fit into the slots 25, either the assembly 10 or the assembly 20 may be twisted to lock the pegs 15 in place, thereby securing the assembly 10 to the assembly 20.

FIGS. 4B-4C illustrate a top perspective and a top down (respectively) view of the tool side assembly 20. As can be seen, the tool side assembly 20 includes actuator attachment portions (e.g., 20-1), slots 25, and connection port 26. FIG. 4D illustrates a side view of the tool side assembly 20. As can be seen, the tool side assembly 20 may include a top stepped or recessed portion 22 configured to fit into a corresponding recessed portion in the interface portion 11 of the master side assembly 10.

Figure 6:
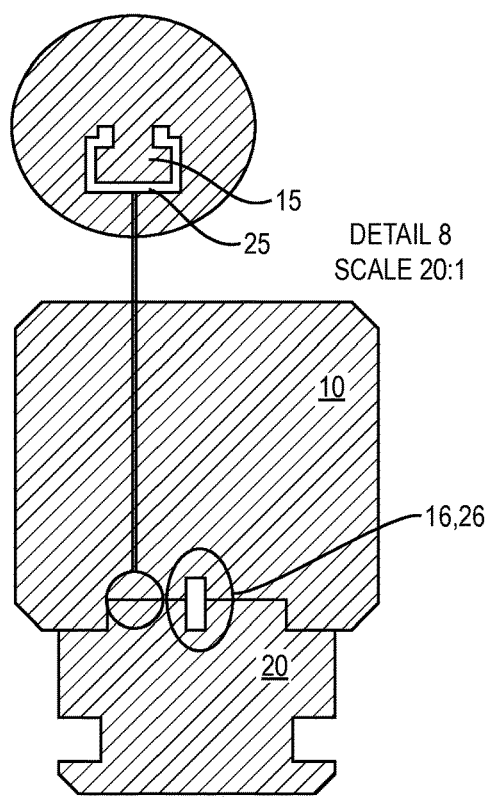
FIG. 6 is a cross sectional view of the twist lock interface of FIGS. 4A-4D.

Additionally, the connection ports 16 and 26 may seal or form a seal when the assemblies 10 and 20 are secured together (e.g., refer to FIG. 6). As such, a sealed pathway or connection point for inflation lines (e.g., pneumatic, hydraulic, or the like) as well as electrical signal lines can be provided through the connection points 16 and 26.

Figure 5:
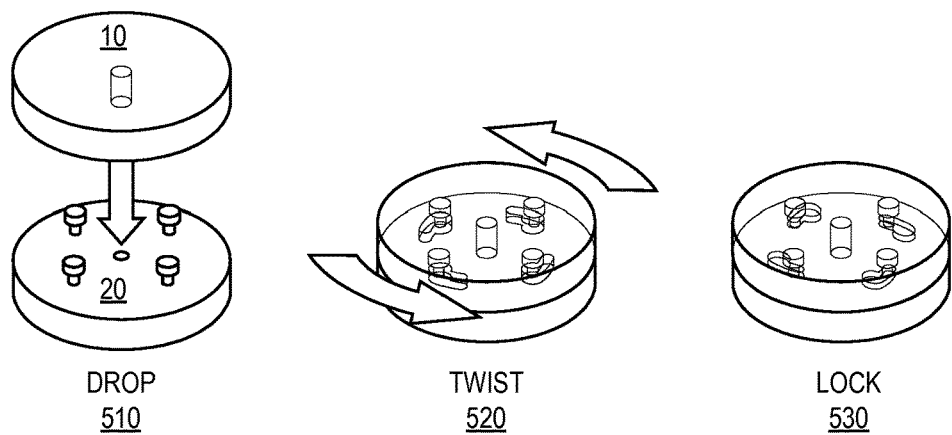
FIG. 5 is an illustration of a method of using the twist lock interface of FIGS. 4A-4D.

FIG. 5 illustrates a method for securing the tool side assembly 20 to the master side assembly 10. In particular, at 510, the interface portion 11 of the master side assembly 10 is lowered (or dropped) onto the interface portion 21 of the tool side assembly 20. In particular, the interface portions 11 and 21 are brought together such that the pegs 15 fit into the slots 25. It is important to note, that this figure depicts pegs disposed on the tool side assembly and slots on the master side assembly. Examples are not to be limited in this context. At 520, the master side assembly 10 is twisted relative to the tool side assembly 20 to lock the pegs 15 into the slots 25. Accordingly, at 530, the tool side assembly 20 is securely coupled to the master side assembly 10.

FIG. 6 illustrates a cross sectional view of the assembled hub 100. In particular, as depicted, the pegs 15 are secured into slots 25 and the connection points 16 and 26 form a sealed connection.

Figure 7A:
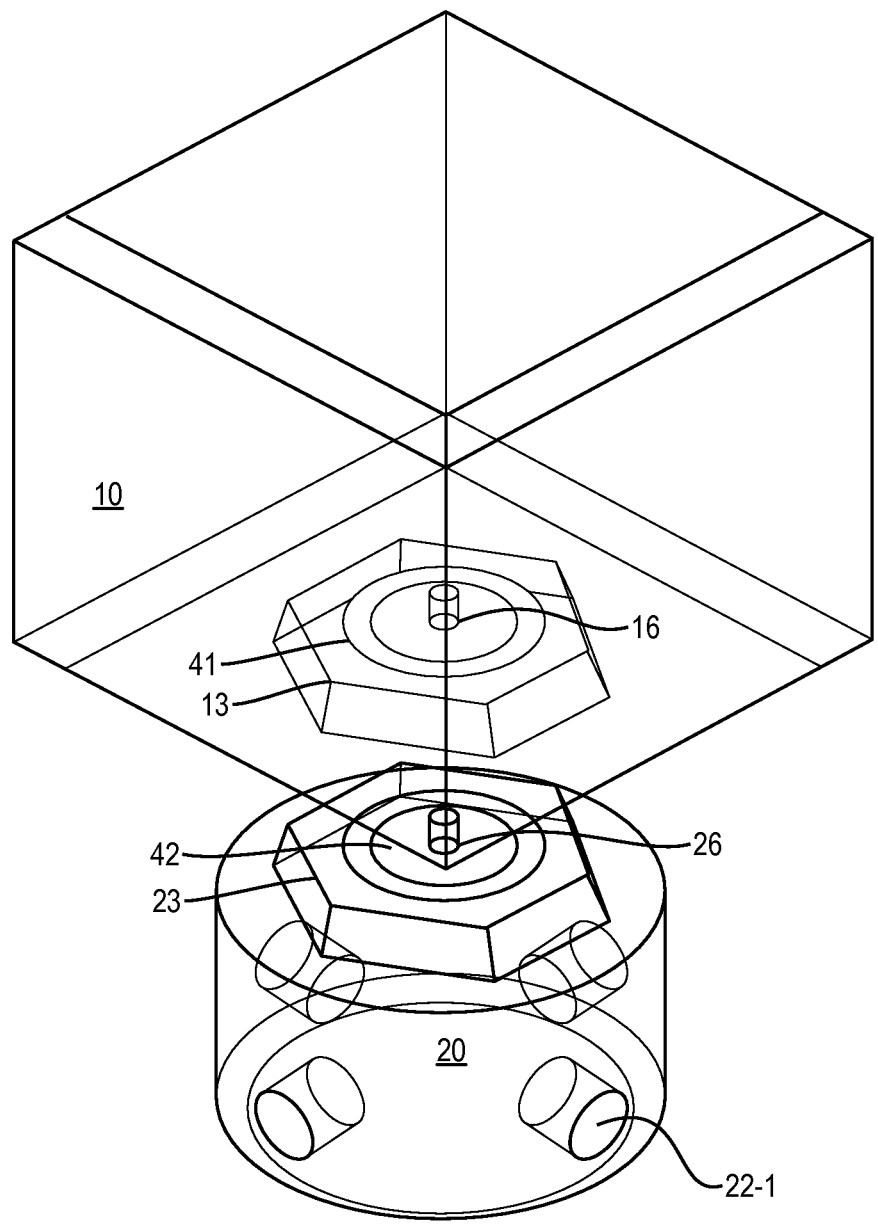
FIGS. 7A-7G are perspective views illustrating an exemplary magnetic interface for the hub assembly of FIG. 1.

FIGS. 7A-7G depict an example of the hub assembly 100 including a magnetic interface. In particular, FIG. 7A illustrates an exploded bottom up perspective view of the hub assembly 100 showing the master side assembly 10 and the tool side assembly 20. Furthermore, actuator attachment portions (e.g., 22-1) are shown in the tool side assembly 20. Furthermore, details of the interface portions 11 and 21 are shown. In particular, the interface portion 11 includes connection ports 16 and 26, respectively. Furthermore, the interface portion 11 includes a geometric (e.g., hexagonal, triangular, rectangular, star shaped, or the like) recess 13 while the interface 21 includes a corresponding geometric stepped portion 23. The stepped portion 23 is configured to fit into the recessed portion 13. Furthermore, the interfaces 10 and 20 include magnetic portions 41 and 42, respectively. The geometric stepped portion 23 and the recessed portion 13 are configured to prevent any shear forces from disengaging the tool side assembly 20 from the master side assembly 10. Furthermore the stepped portion 23 and the recessed portion 13 facilitate the location and insertion of the tool side assembly 10.

Figure 7C:
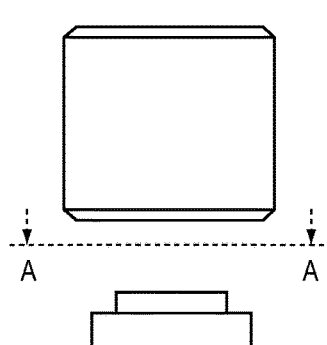
Figure 7D:
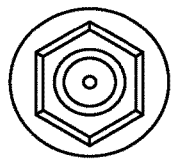
Figure 7B:
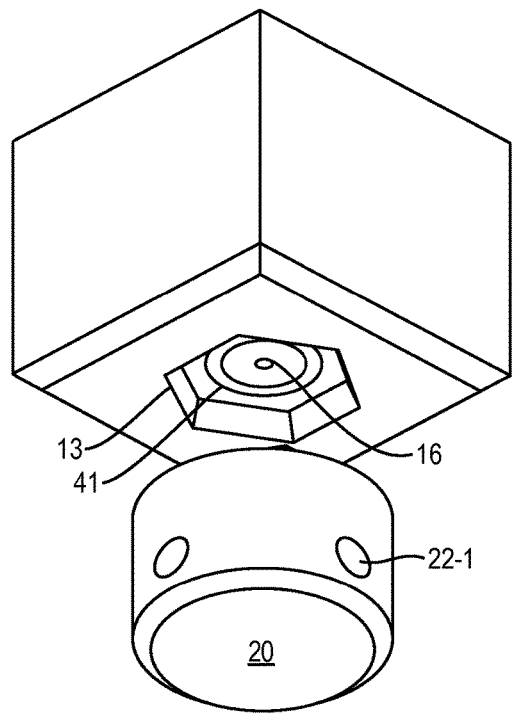
Figure 7E:
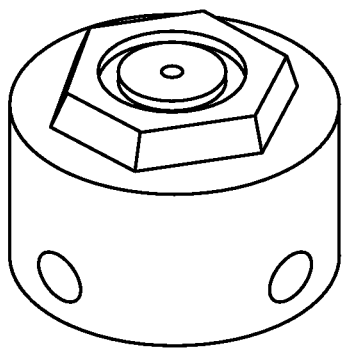
Figure 7F:
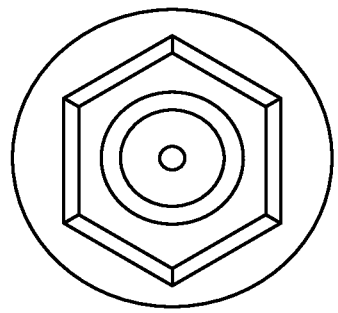
Figure 7G:
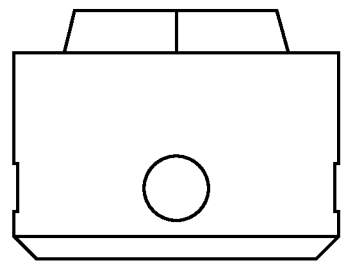

FIGS. 7B-7C illustrate the hub assembly 100 in an alternative perspective view and a side view, respectively. Additionally, FIGS. 7D-7G illustrate the tool side assembly from various angles and/or views.

Figure 8:
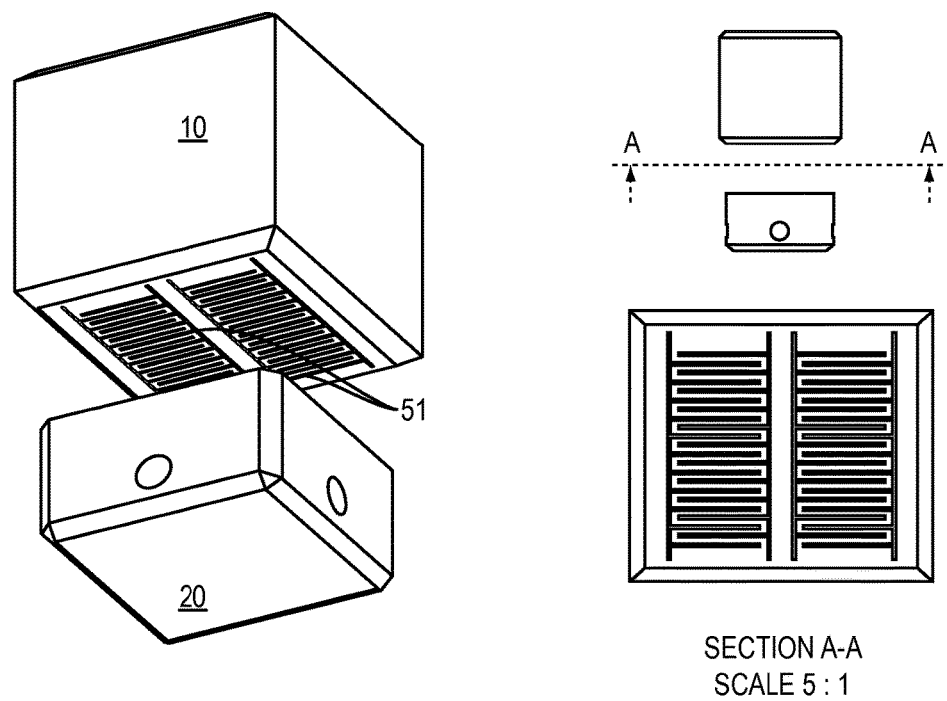
FIG. 8 is a perspective view illustrating an exemplary electrostatic adhesion interface for the hub assembly of FIG. 1.

FIG. 8 depicts an example of the hub assembly 100 including an electrostatic adhesion interface. In particular, this figure illustrates an exploded bottom up perspective view of the hub assembly 100 showing the master side assembly 10 and the tool side assembly 20. Furthermore, actuator attachment portions (e.g., 22-1) are shown in the tool side assembly 20. Furthermore, details of the interface portions 11 are shown. In particular, the interface portion 11 includes electrostatic adhesion pads 51. As depicted, the electrostatic adhesion pads are disposed on the master side assembly 10. However, in some examples, the electrostatic adhesion pads 51 can be disposed on the tool side assembly 20. Furthermore, in some examples, electrostatic adhesion pads (e.g., 51) may be disposed on both the master side assembly and the tool side assembly interface portions 11 and 21. In still further embodiments, one or more electrostatic adhesion pads may be embedded in the body of the soft actuator, at various points along the gripping surface of the actuator. The electrostatic adhesion pads may augment the gripping strength of the actuator. Exemplary electrostatic adhesion pads are discussed in connection with FIGS. 29A-29C.

Figure 9A:
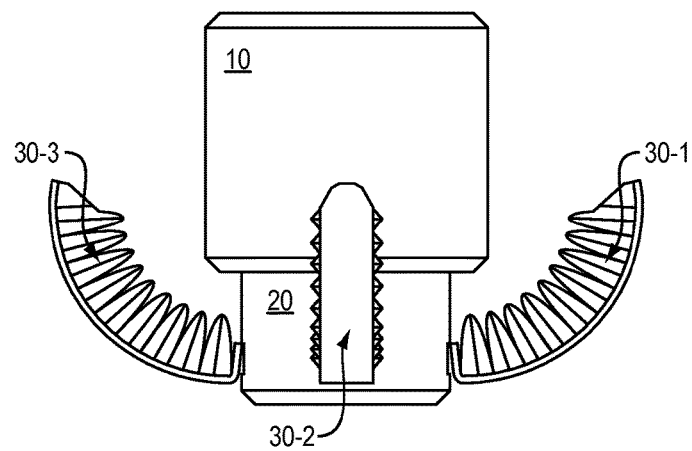
FIGS. 9A-9D are perspective views illustrating an example grasper using the hub assembly of FIG. 1 and soft actuators.
Figure 9B:
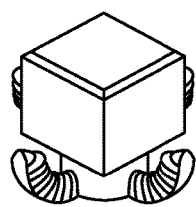
Figure 9C:
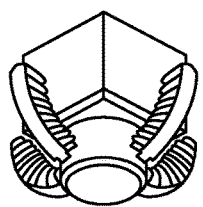
Figure 9D:
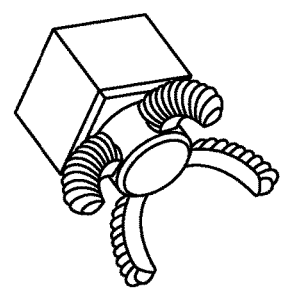

FIGS. 9A-9D illustrate an example hub assembly 100 and an example configuration of soft actuators 30 attached to the tool side assembly 20. In particular, the soft actuators 30 are depicted in FIGS. 9A-9C as deflated to vacuum (e.g., reverse inflated) to provide an increase in grasping fidelity. In some examples, the connection ports 16, 26 may provide for sealing inflation lines between the assemblies 10 and 20 such that the soft actuators 30 can be deflated and/or inflated. In some examples, the soft actuators 30 may be inflated from the deflated portion, resulting in inflated actuators 30, as shown in FIG. 9D.

Figure 10A:
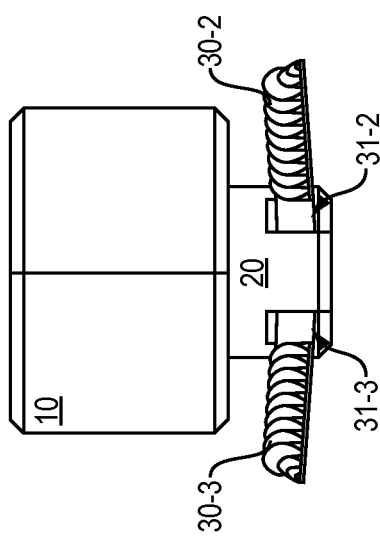
FIGS. 10A-10C are perspective views illustrating an example grasper using the hub assembly of FIG. 1 and soft actuators having electro mechanical portions.
Figure 10B:
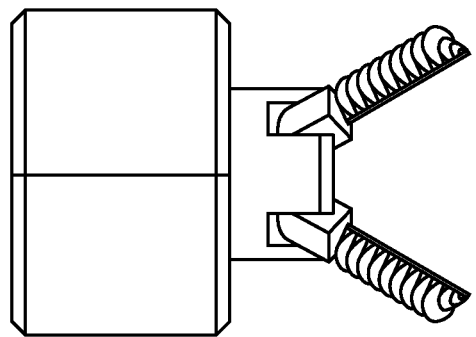
Figure 10C:
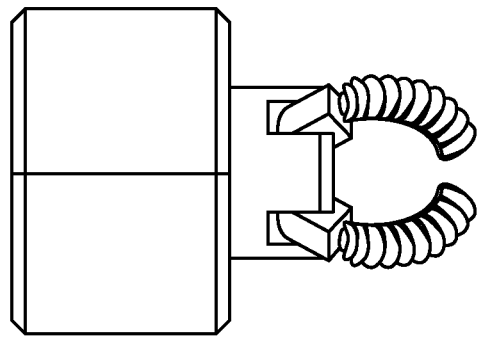

FIGS. 10A-10C illustrate an example hub assembly 100 and an example configuration of soft actuators 30, that include an electro-mechanical portion 31. The electromechanical portions 31 can be used to modify and/or adjust the angle of attack of the actuators from when they are in the neutral position (e.g., refer to FIGS. 10A-10B) to when they are in the inflated position (e.g., refer to FIG. 10C).

Figure 11A:
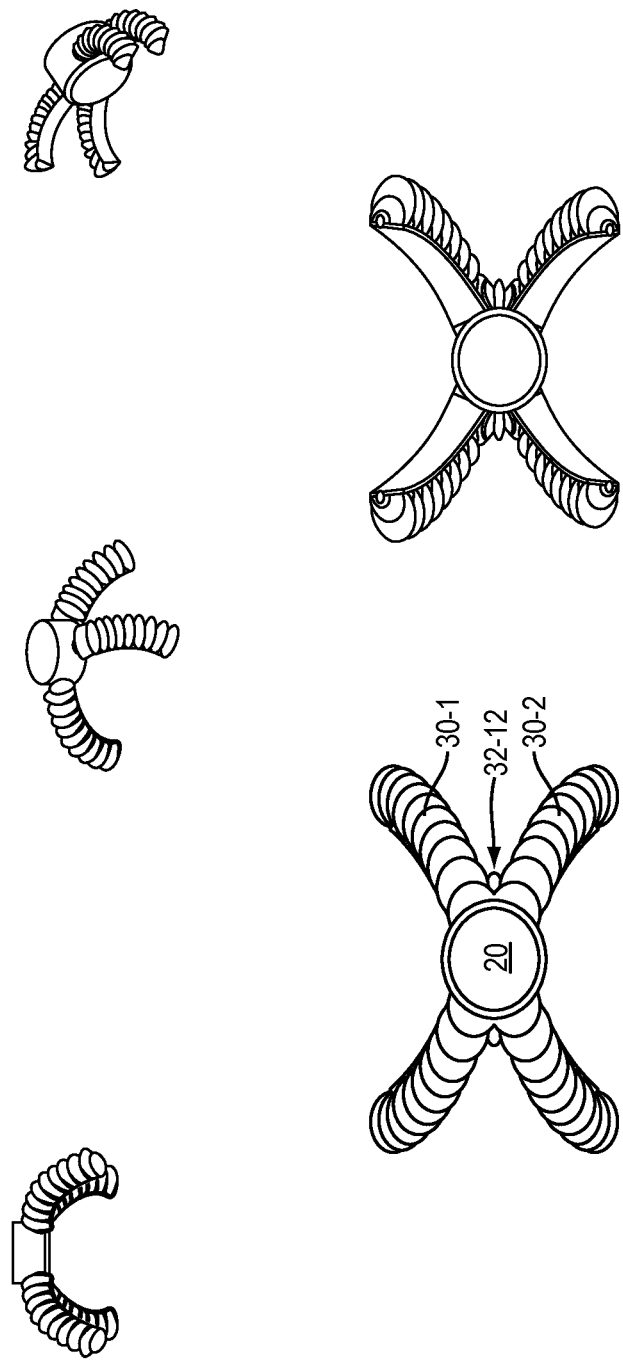

FIGS. 11A-11E depict an example of the tool side assembly 20 and attached soft actuators 30. In some examples, a tool side assembly 20 may be provided with the soft actuators depicted in this example to adjust the angle of attack for picking up object. For example, FIG. 11A illustrates the tool side assembly 20 and the soft actuators 30 from various angles and perspectives. As depicted, the soft actuators 30 include soft angle adjustors 32. FIG. 11B illustrates a bottom view of the tool side assembly 20 with the soft actuators 30 attached and a magnified view 200 of the soft angle adjustors 32. As can be seen, the soft angle adjustors 32 are disposed laterally between the soft actuators 30. During operation, the soft angle adjustors 32 can be independently inflated and deflated (e.g., independent from each other, independent from the soft actuators, some combination of this, or the like) to adjust the angle between the soft actuators 30.

Figure 11C:
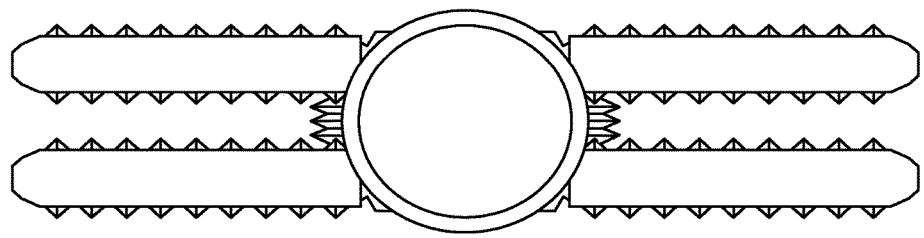
Figure 11D:
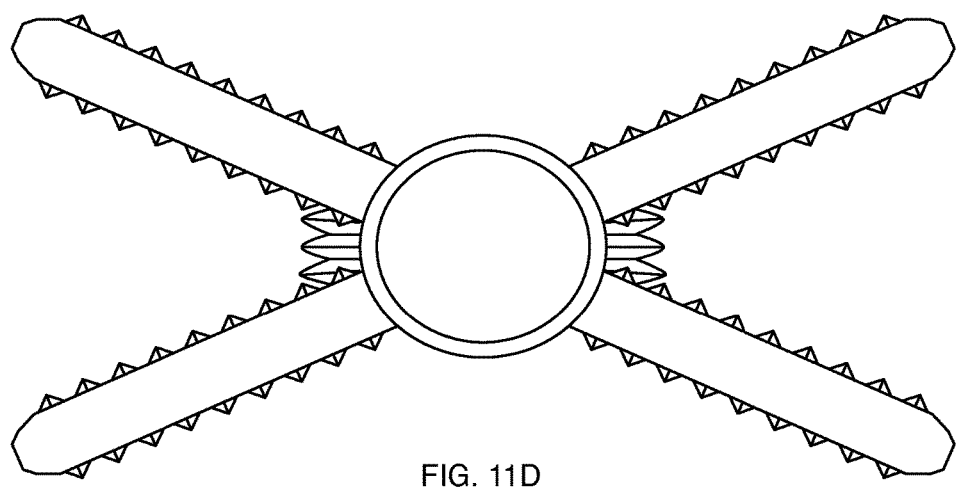
Figure 11E:
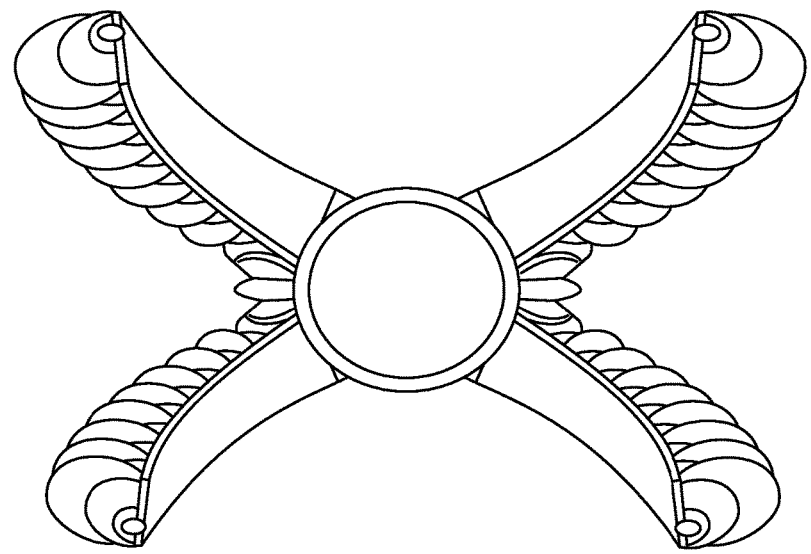

FIG. 11C-11E illustrate the soft actuators 30 and soft angle adjustors 32 in various states. In particular, FIG. 11C illustrates the soft actuators 30 in a neutral position and the soft angle adjustors 32 deflated. As such, the angle between pairs of the soft actuators 30 (e.g., between 30-1 and 30-2 and between 30-3 and 30-4, or the like) is reduced. FIG. 11D illustrates the soft actuators 30 in a neutral position and the soft angle adjustors 32 inflated. As such, the angle between pairs of the soft actuators 30 (e.g., between 30-1 and 30-2 and between 30-3 and 30-4, or the like) is increased. FIG. 11E illustrates the soft actuators 30 in an inflated position and the soft angle adjustors 32 inflated. As such, the angle between pairs of the soft actuators 30 (e.g., between 30-1 and 30-2 and between 30-3 and 30-4, or the like) is increased and the angle of attack of the inflated soft actuators 30 is also increased.

Figure 12A:
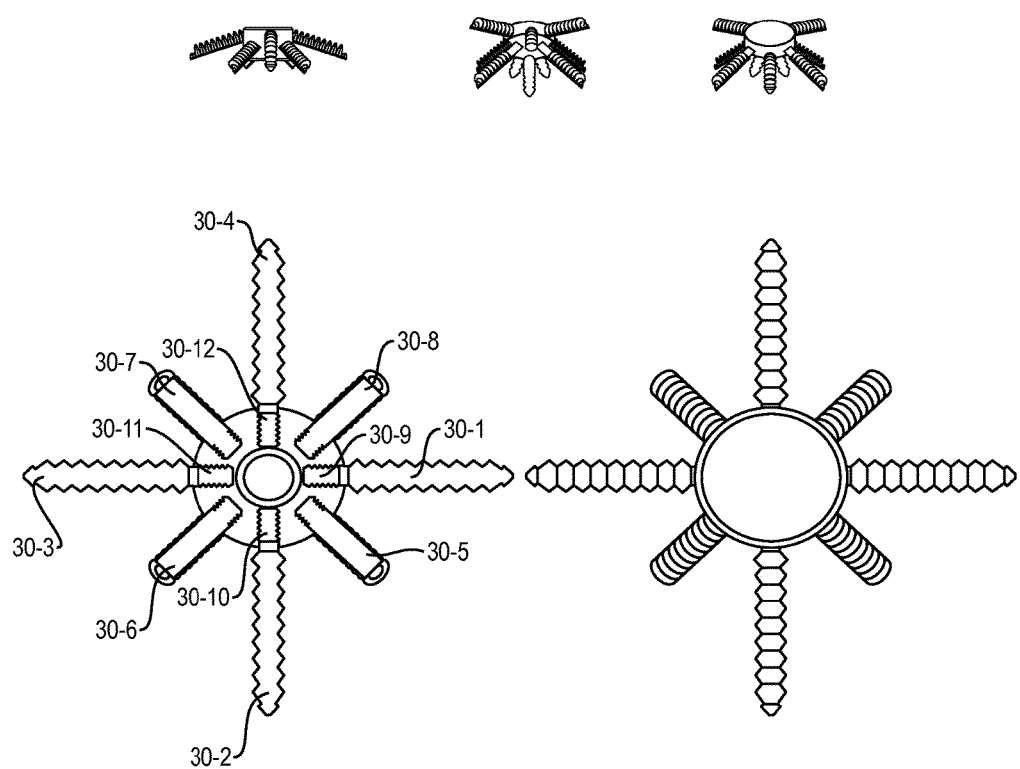
FIGS. 12A-12D are perspective views illustrating a grasper using the hub assembly of FIG. 1 and soft actuators of different lengths configured to substantially enclose an object.
Figure 12B:
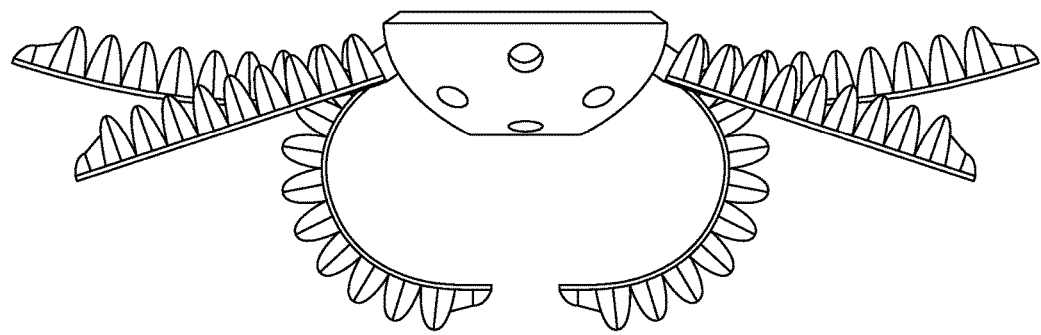
Figure 12C:
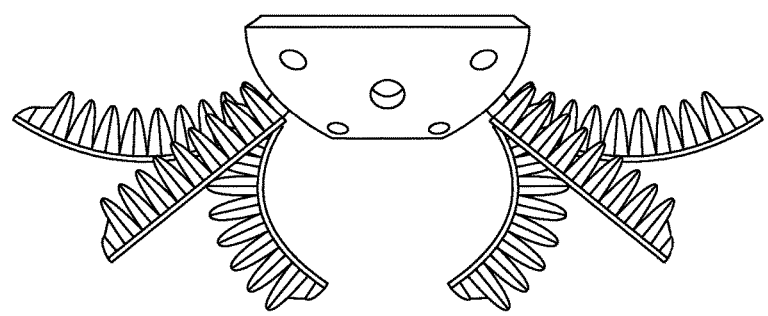
Figure 12D:
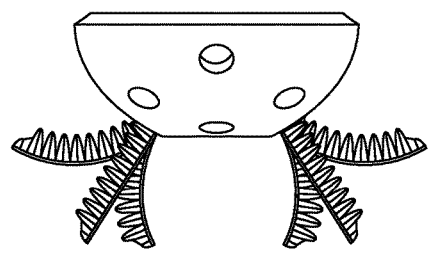

FIGS. 12A-12D depicts an example of the tool side assembly 20 and attached soft actuators 30. In some examples, a tool side assembly 20 may be provided with the soft actuators depicted in this example (e.g., soft actuators of varying sizes) to enable the soft actuators to fully encapsulate and object. For example, FIG. 12A illustrates the tool side assembly 20 and the soft actuators 30 from various angles and perspectives. As depicted, there are a variety of different sized soft actuators 30. In particular, the soft actuators 30 depicted have various lengths. FIGS. 12B-12D illustrate the tool side assembly 20 and each of the different sized the soft actuator 30 and their corresponding range of motion. In particular, FIG. 12B illustrates the longest of the soft actuators 30 and their corresponding range of motion (e.g., deflated to fully inflated). FIG. 12C illustrates the middle length soft actuators 30 and their corresponding range of motion (e.g., deflated to fully inflated). FIG. 12D illustrates the shortest of the soft actuators 30 and their corresponding range of motion (e.g., deflated to fully inflated).

Figure 13:
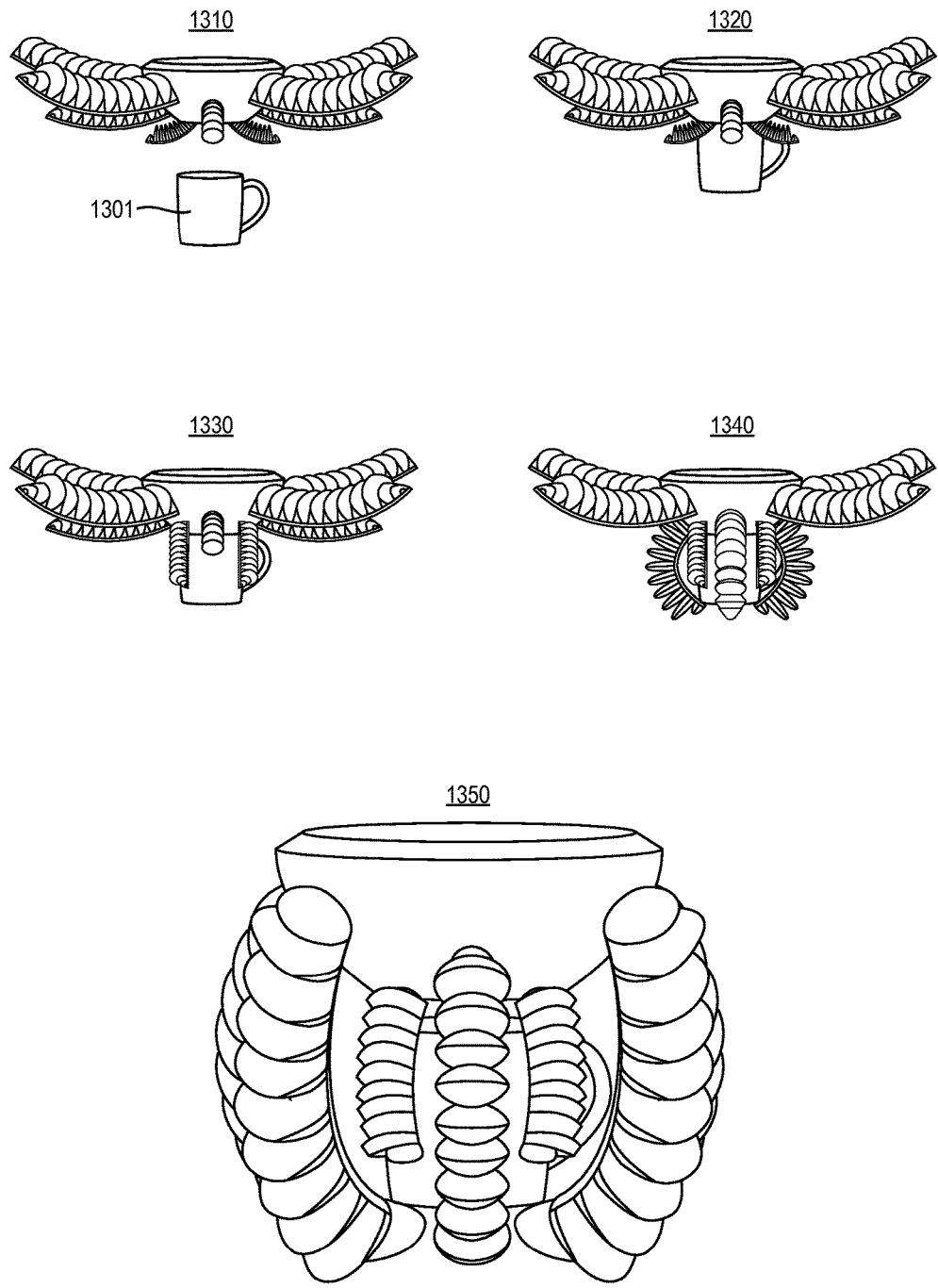
FIG. 13 is an illustration of a method of using the grasper of FIGS. 12A-12D.

FIG. 13 illustrates a method of fully encapsulating an object using an example tool side apparatus and soft actuators arranged according to the present disclosure. In particular, at 1310, the tool side assembly and soft actuators are arranged above an object 1301 to be encapsulated (e.g., mug, or the like). As 1320, the tool side assembly and the soft actuators are lowered or positioned just above the object. At 1330, the shortest soft actuators 30 are inflated to hold the object in place. At 1340, the middle length soft actuators are inflated to more fully surround the object 1301. As 1350, the longest soft actuators are inflated to substantially encapsulate the object 1301.

Figure 14:
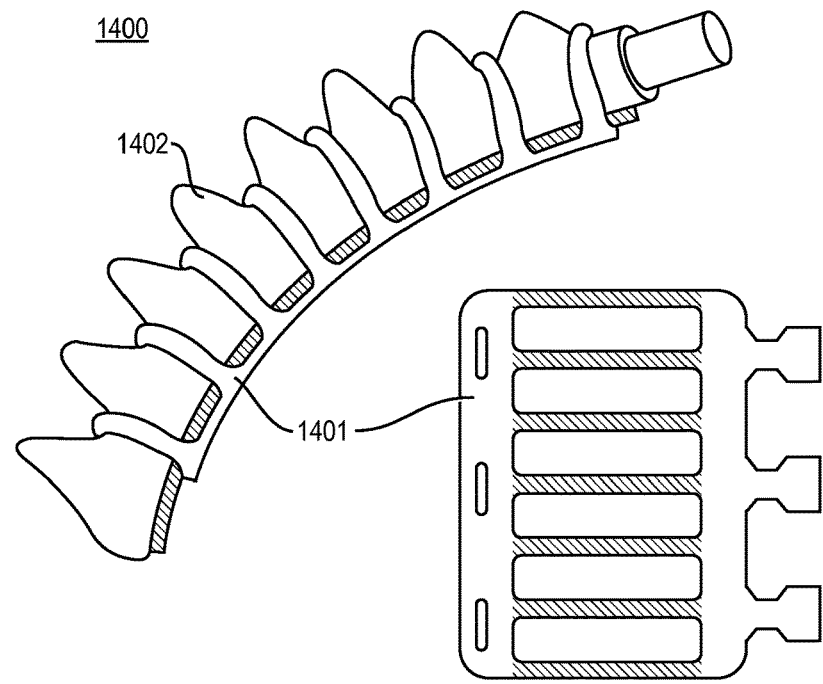
FIGS. 14-21 are perspective views of reinforced actuators.

FIG. 14 depicts an embodiment of a reinforced actuator 1400 that uses a reinforcing wrap 1401 that can be fabricated in a flat sheet and then subsequently affixed about an actuator 1402 by mating its ends in one of a variety of different methods. This reinforcing wrap 1401 may be fabricated through any method suitable for such a shape and is not necessarily limited to being completely flat. For instance it may be formed to achieve texture for gripping, ridges for stiffness, or unfolding features to accommodate extension. The material from which the reinforcing warp 1401 is made may vary greatly depending on the intended application. For example, without limitations, the wrap 1401 can be fabricated from metal meshes or fabrics, polypropylene, polyester, polyethylene, lubricant impregnated polymers, mylar, spandex, neoprene, nitrile, latex, textiles, elastomeric textiles, sealable or film coated textiles, elastomers, thermoplastic films or sheets, thermoplastic elastomer films or sheets, nonwoven textiles, paper or other cellulosic materials, uniaxially oriented textiles, fibrous composites, foams, thermoplastic foams, thermoplastic elastomer foams, thermally and electrically conductive materials, strain sensitive materials, flexible electronic substrates such as polyamide, and others. In addition, the reinforcing wrap 1401 may also include less flexible stiffening elements designed to provide completely rigid regions or tunably stiff regions. Such materials may include, for example, nitinol hyper-elastic springs, spring steel, metal plates, helical springs, plastic or thermoplastic plates, traditional printed circuit boards, and others.

Figure 15:
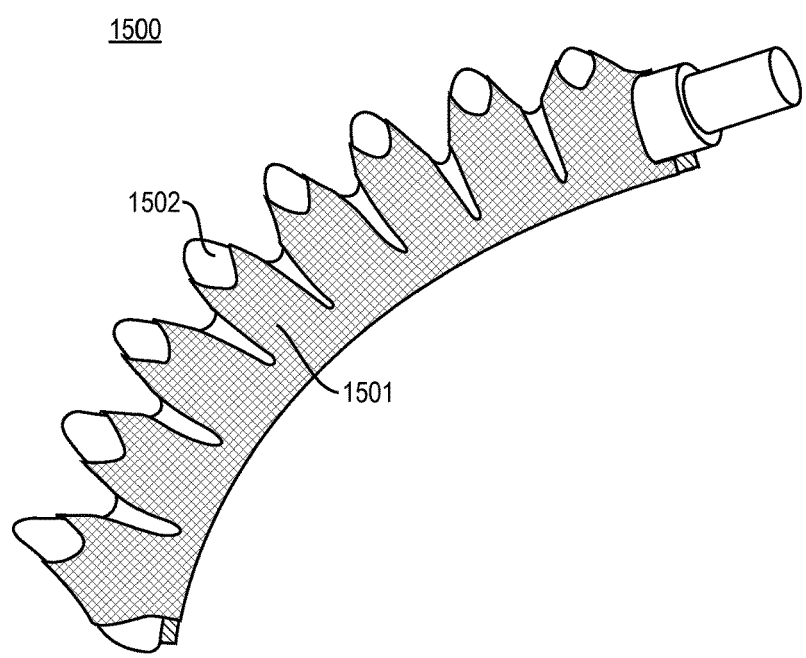

FIG. 15 depicts a reinforced actuator 1500 including a reinforcing wrap 1501 that can be constructed from woven materials, such as, for example, a co-weave of elastomeric strands such as neoprene or spandex. The wrap 1501 has the unique ability to apply tension and conform about the surface of the actuator 1502 it is reinforcing. By default a specific amount of expansion will be resisted by the elasticity of the fabric up to some point where the mesh angle of fabric collapses and it begins to respond as a rigid fibrous mesh.

Figure 16:
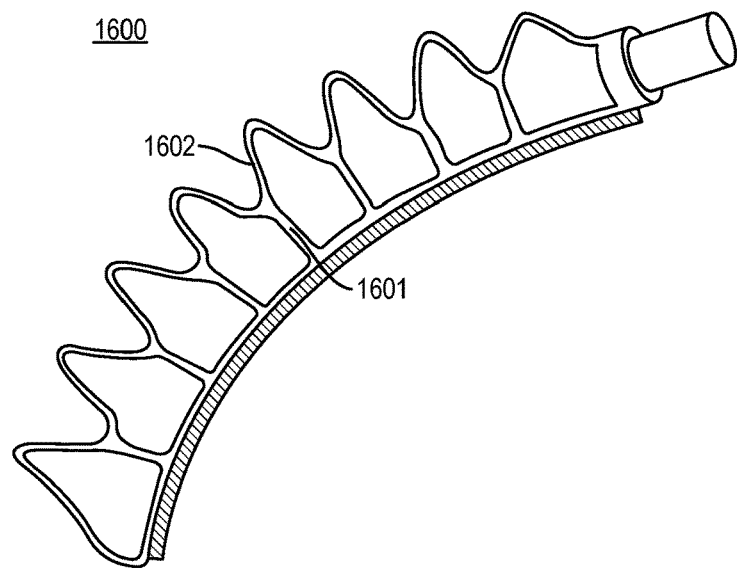

FIG. 16 depicts a reinforced actuator 1600 having internal reinforcements 1601 molded within the body of the actuator 1602. Such a configuration may reinforce the actuator 1600 against undesirable expansion.

Figure 17:
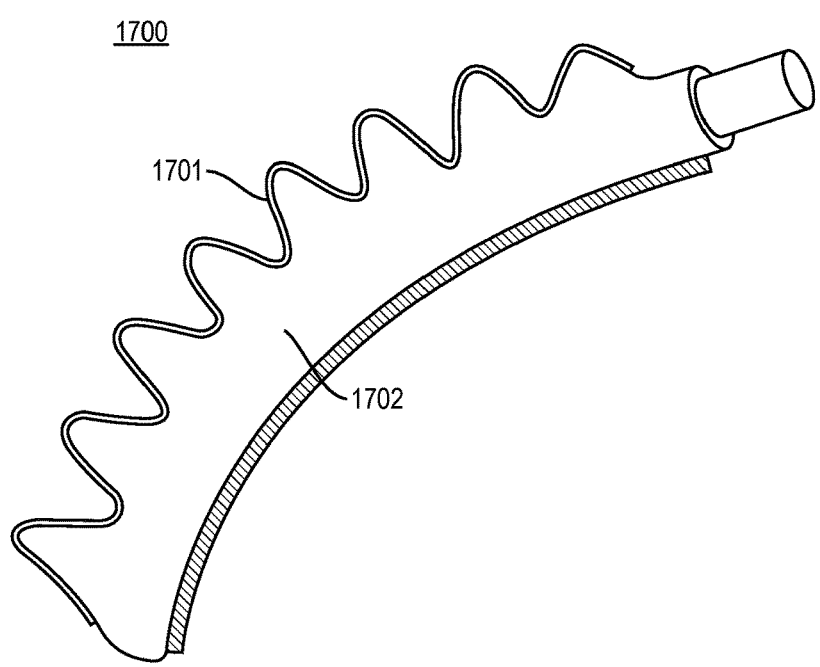

FIG. 17 depicts a reinforced actuator 17000 including an external reinforcement 1701. The external reinforcement 1701 may be a tunably stiff element configured to change the resistance of the actuator 1702 to unfolding and extending under pressure. For example, the external reinforcement 1701 may be a member that is rigid along the straight sides of the accordion geometry (depicted as checkered) and "spring-like" in the curved regions between (depicted as white) augments the normal response of the accordion actuator to pressure and effectively raises its operating pressure regime. This leads to a part which is substantially stiffer in the curved state and which is capable of exerting greater forces on its environment.

Figure 18:
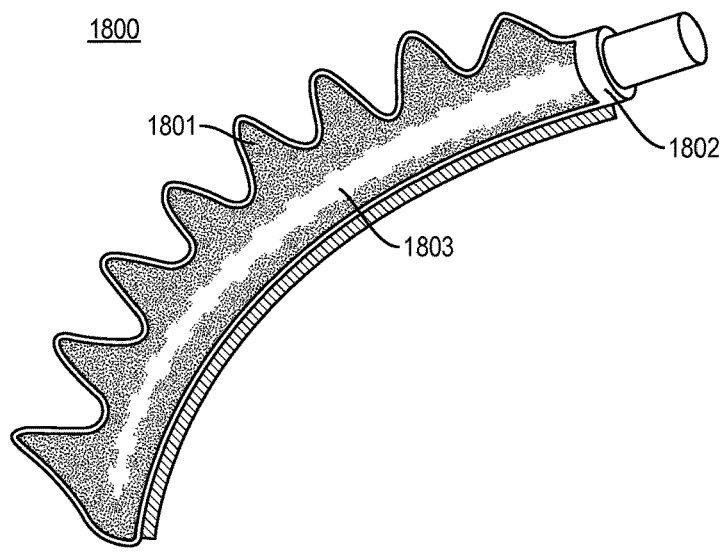

FIG. 18 depicts a reinforced actuator 1800 including dampening reinforcements 1801 disposed inside the actuator 1802. The actuator 1800 may be implemented in systems where closed loop control is to be applied or in applications where a high level human interaction dictates the appearance of precise control. In such systems it is often desirable to dampen oscillations within the system. For example, it may be advantageous to reject oscillations introduced by external stimuli and control the actuator 1800 in a frequency band far from its mechanical natural resonance frequency. To this effect, the dampening reinforcements 1801 may be highly damping viscoelastic foams or gels that fill the interior of the actuator 1802 in an open celled configuration. An inflation channel 1803 is left open in this depiction to ensure all areas of the actuator inflate at the same time. If the material comprising the dampening reinforcement 1801 is mechanically robust as well as highly damping, it can also serve as a voluminous internal reinforcement against undesired expansion of the part.

Figure 19:
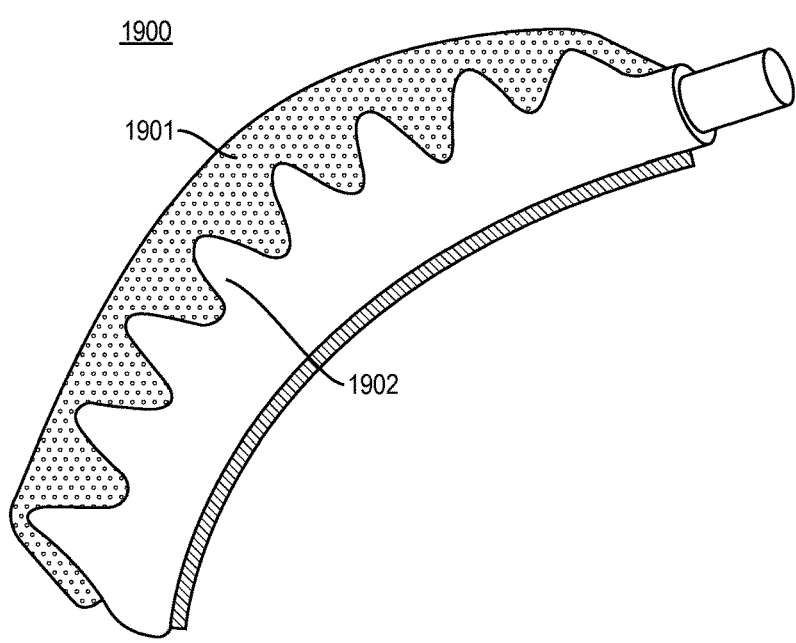

FIG. 19 depicts a reinforced actuator 1900 where a dampening reinforcement 1901 (e.g., similar to that dampening reinforcement 1801) is disposed on the exterior of the actuator 1902. This amplifies their damping effect, as this region of the part must stretch the most for the actuator 1902 to bend.

Figure 20:
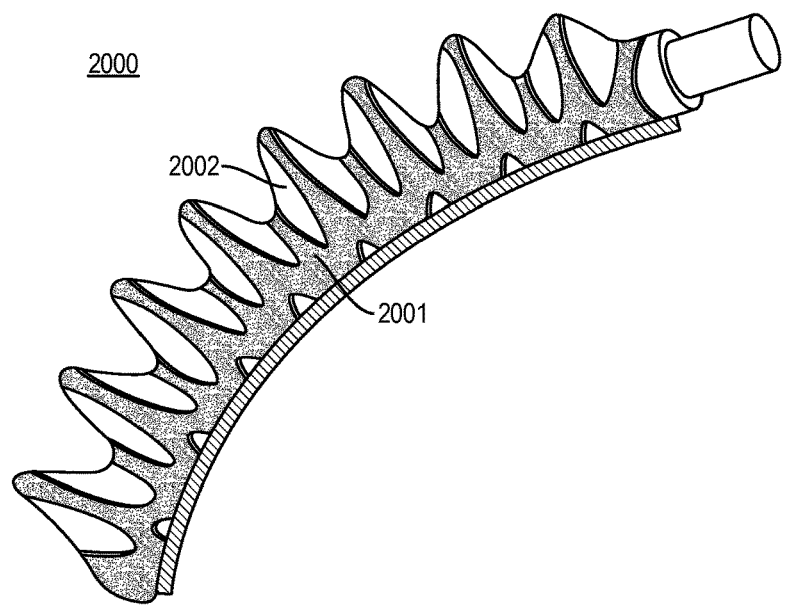
Figure 21:
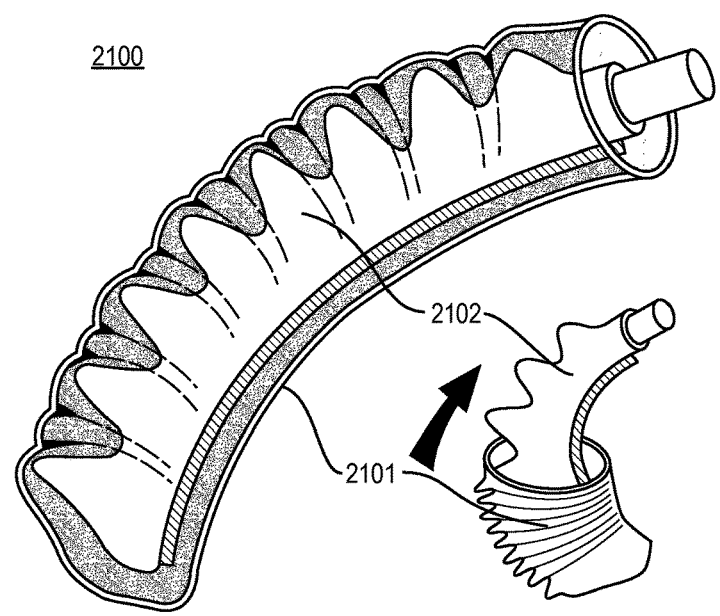

FIG. 20 depicts a reinforced actuator 2000 that including an external reinforcement 2001 and an actuator 2002. The external reinforcement 2001 may have any of a variety of configurations and features, even complex configurations and features. Such complex external reinforcement features may be achieved using additive manufacturing techniques. In such techniques, a material that is sensitive to a particular wavelength or spectrum is applied uncured to a surface upon which it is subsequently cured via exposure to radiation. In particular, the use of micro dispensed fluids also enables the deposition of a controlled mixture of multiple compounds across a surface, effectively setting up micro-scale reactions on the surface that can spatially modulate the properties of the cured material. Such techniques may be employed to form the complex reinforcement 2001 shown on the surface of a soft actuator 2002. Additionally, these techniques may be employed on the surface of soft actuators to selectively add patterned layers of material with a wide range of properties. They may be stiff reinforcements, elastomeric textures, aesthetic patterns, optical elements, protective layers, conductive layers, or strain sensitive resistive materials FIG. 21 depicts a reinforced actuator 2100 comprising a soft actuator 2102 and a protective skin 2101 drawn over the soft actuator 2102. Thin and wrinkled or highly elastomeric skin materials can be used for a multitude of different applications including protection of the actuator, containers for filler materials (not shown) that surround the actuator, high or low friction, chemical resistance, or the like.

Figure 22:
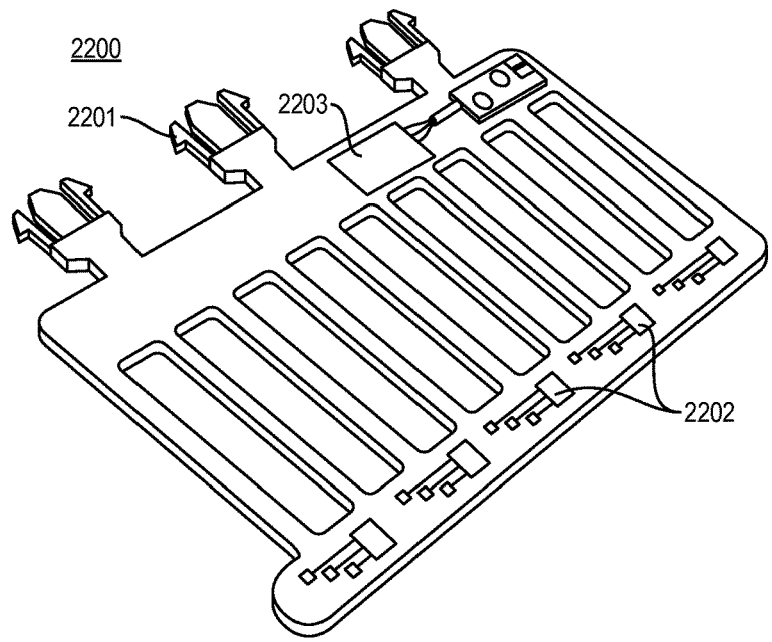
FIGS. 22-26 are perspective views of reinforcing wraps for use with a soft actuator.

FIGS. 22-26 depict examples of reinforcing wraps (e.g., the wrap 1401, 1501, or the like) that may be implemented with various examples of the present disclosure. The wraps 1401 and 1501 discussed above may be formed as described below. Turning to FIG. 22, a reinforcing wrap 2200 is depicted. The wrap 2200 can be permanently or reversibly affixed about an unfolding accordion soft actuator. The wrap 2200 can be formed using laser cutting, knife cutter plotting, sewing, impulse sealing, RF welding, ultrasonic welding, hot embossing, compression molding, or injection molding. Additionally, the wrap 2200 may include side release buckles 2201 to be affixed about a soft actuator. The wrap 2200 can also houses a number of sensors 2202 and/or electrical payloads 2203 that may be disposed on and/or embedded within the wrap 2200. For example, as depicted, the electrical payload 2203 includes a traditional printed circuit board with microcontroller based application circuit, battery power and distribution, and a suite of myoelectric sensors 2202 designed to detect the muscle intent of the biological subject they are in contact with.

Figure 23:
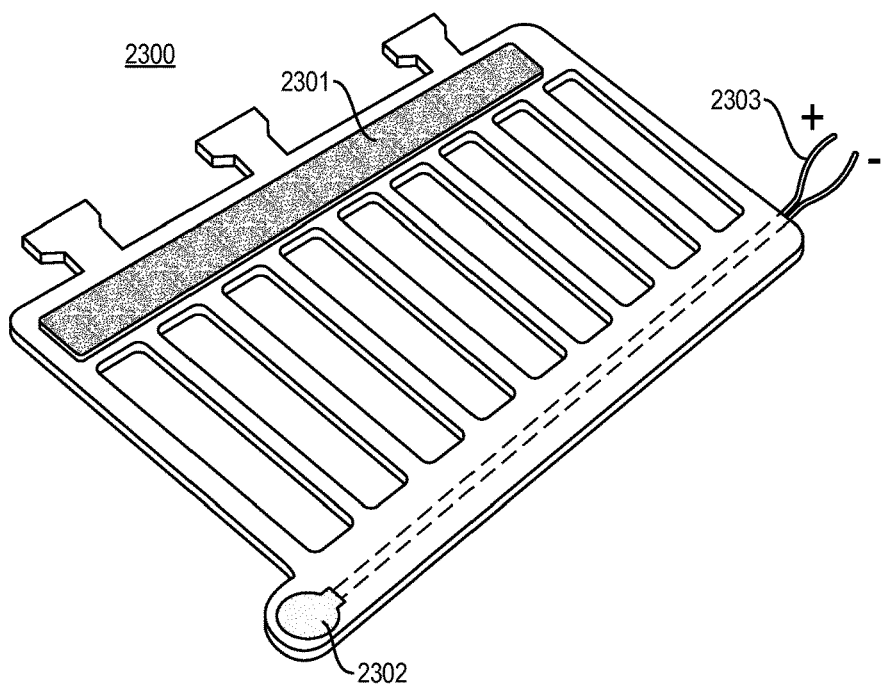

Turning now to FIG. 23, a reinforcing wrap 2300 is depicted. The wrap 2300 may include any combination of features described above for reinforcing wraps. Additionally, the wrap 2300 includes re-closable interlocking pegs 2301 as a fastener and force sensing resistors or pressure transducers 2302 sensed via conductive threads 2303 embedded within the wrap material.

Figure 24:
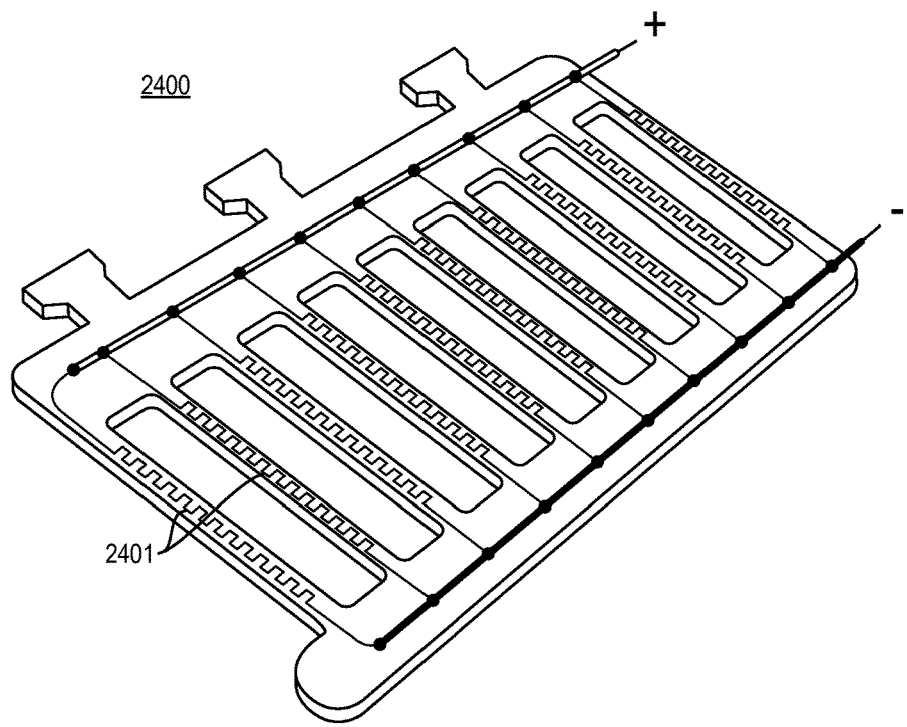

Turning now to FIG. 24, a reinforcing wrap 2400 is depicted. The wrap 2400 may include any combination of features described above for reinforcing wraps. Additionally, the wrap 2400 includes strain sensing materials 2401 spanning the reinforcements that connect the two halves of the wrap's structure.

Figure 25:
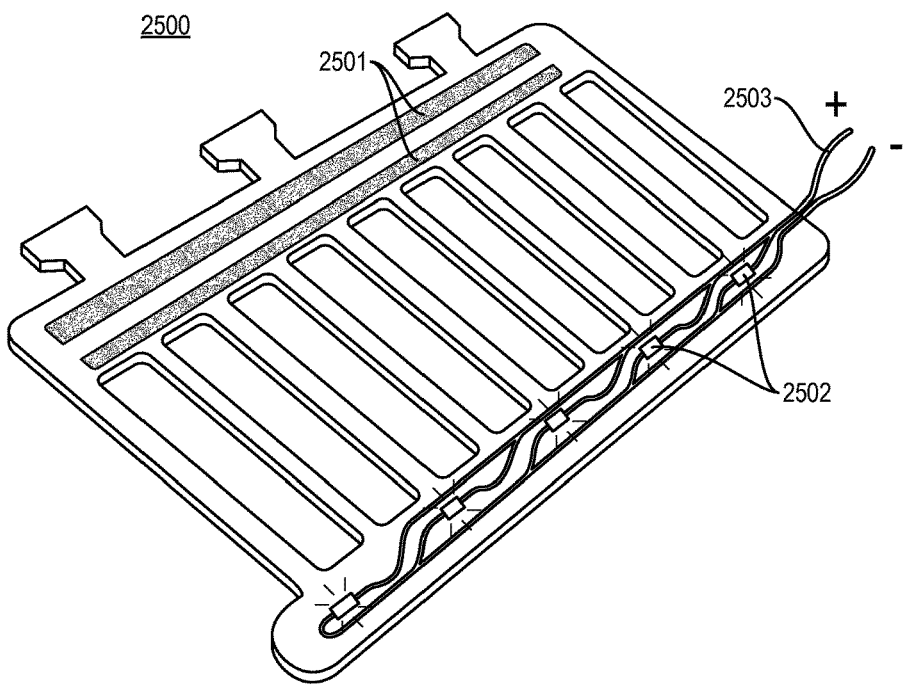

Turning now to FIG. 25, a reinforcing wrap 2500 is depicted. The wrap 2500 may include any combination of features described above for reinforcing wraps. Additionally, the wrap 2500 includes strips of adhesive 2501 as a fastener and a bank of light emitting diodes 2502 powered externally via wires 2503 embedded within the wrap.

Figure 26:
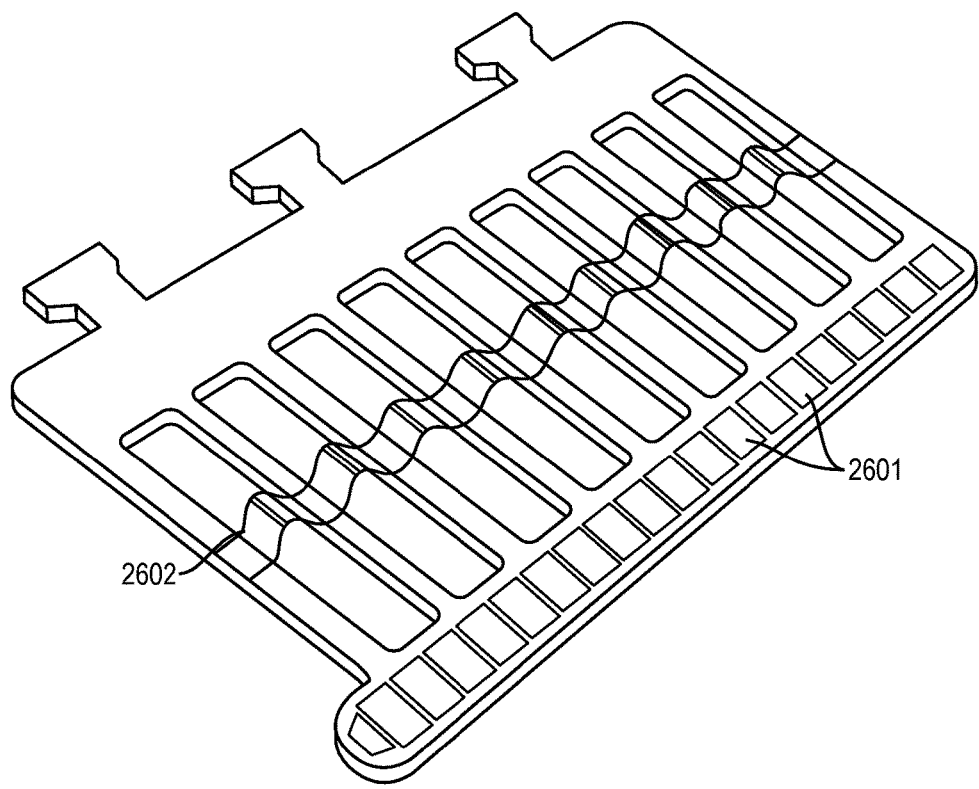

Turning now to FIG. 26, a reinforcing wrap 2600 is depicted. The wrap 2600 may include any combination of features described above for reinforcing wraps. Additionally, the wrap 2600 includes protective armor plates 2601 embedded within its bottom facing surface and a tuned nitinol or spring steel accordion spring 2602 to provide additional resistance to unfolding and elongation of the contained actuator.

Figure 27:
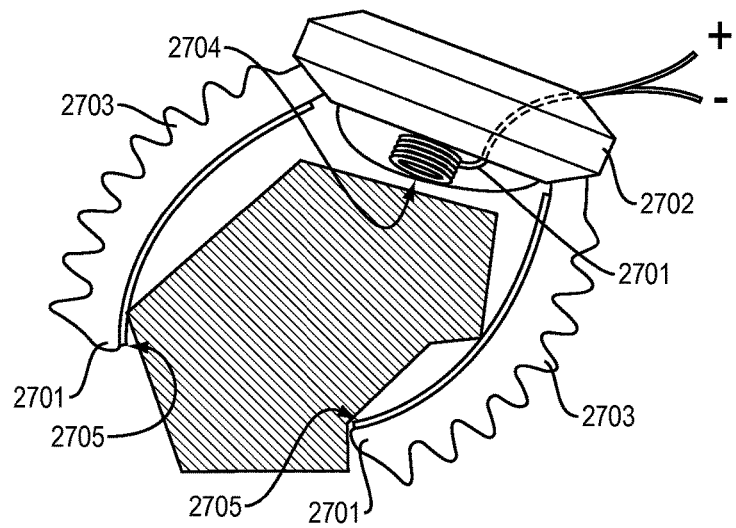
FIGS. 27-28 depict an exemplary soft actuator having embedded electromagnets properties
Figure 28:
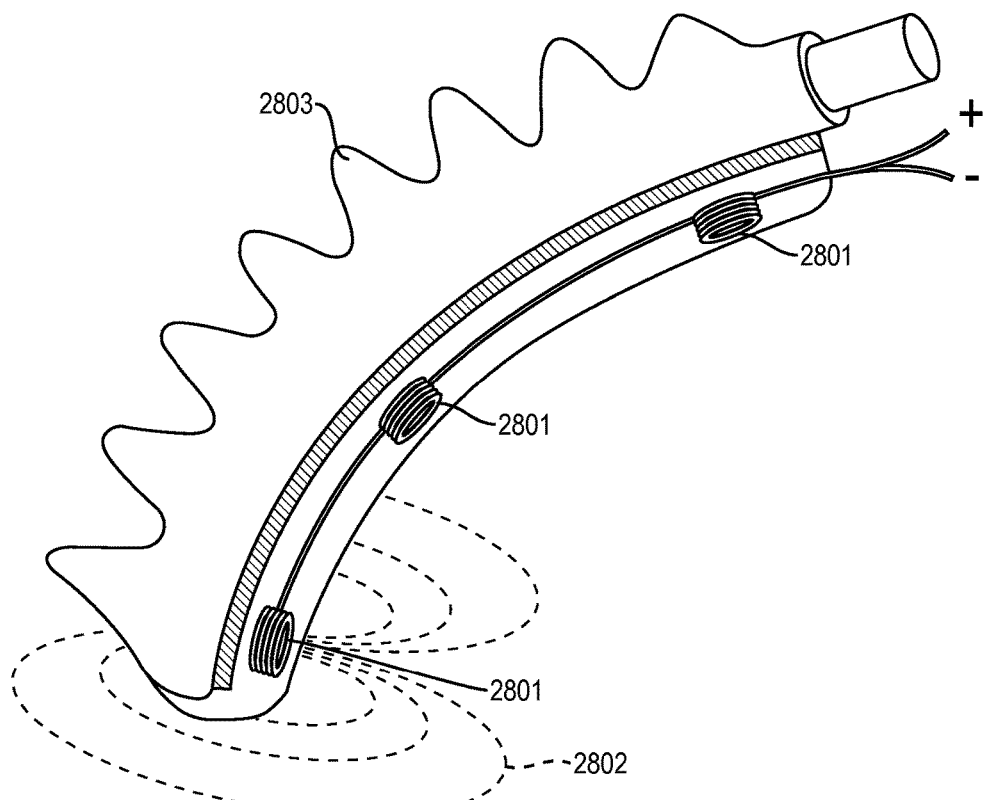

FIG. 27 and FIG. 28 depict examples of actuators having embedded electromagnets 2701, 2801 for allowing the actuators to interface with an object being gripped, for example through induction coils in the electromagnet or located on the surface of the object.

The embodiment depicted in FIG. 27 includes a single electromagnet 2701 embedded in the base of the hub 2702, where the hub 2702 attaches to the actuators 2703 and orients the actuators 2703. This allows the electromagnet 2701 to interact with a complementary surface on the top of the gripped object, facing towards the direction of the hub 2702, as shown by the arrow 2704. Two additional electromagnets 2701 are included, one at the end of each actuator 2703. This allows the electromagnets 2701 to interface with complementary surfaces facing in the directions indicated by the arrows 2705.

The embodiment depicted in FIG. 28 includes three electromagnets 2801. Although the depicted embodiment includes three electromagnets 2801 embedded in the side of the actuator 2803, exemplary embodiments may employ one or more electromagnets 2801. For reference, exemplary electromagnetic field lines 2802 are shown in relation to the bottom electromagnet 2801.

The electromagnets 2801 may be rigid, flexible, or elastomeric and may be embedded within the material of the actuator 2803. The location of electromagnetic elements within the actuator 2803 may be selected such that complementary textures or surface properties are present on either the actuator or the object being gripped (e.g., ferromagnetic material, roughened surfaces, pressure sensitive adhesive, suction cups, etc.), or as a means of interacting with an object that has electrical subsystems. For instance, if the object which is gripped has a corresponding inducting coil, the activation of the electroadhesive pads 2801 within the actuator 2803 may be used to induce electrical current in the gripped object for purposes of providing power or communicating.

Figure 29A:
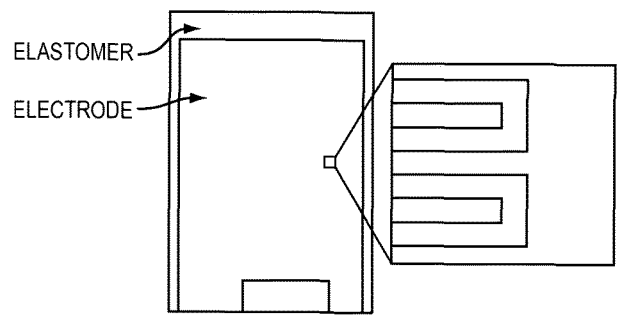
FIGS. 29A-29C depict exemplary electroadhesive structures suitable for embedding in a soft actuator.
Figure 29B:
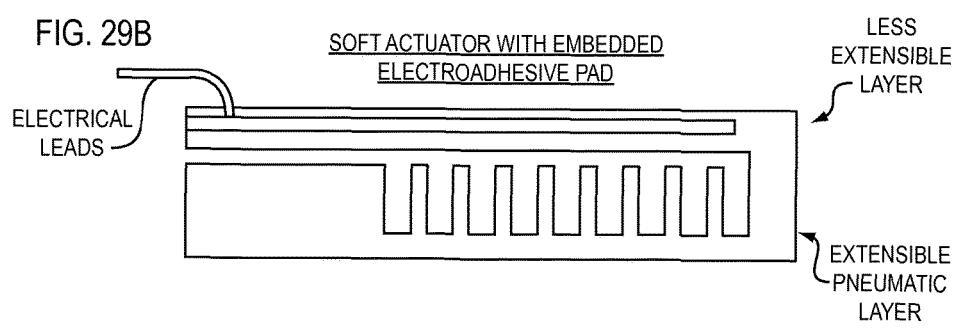
Figure 29C:
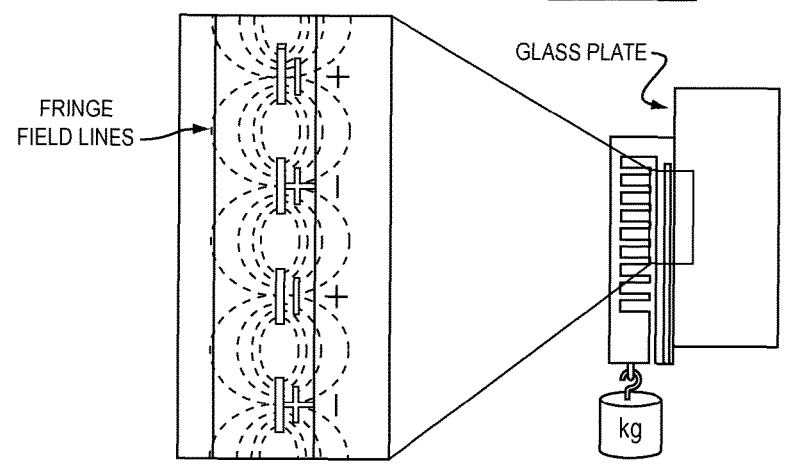

FIGS. 29A-29C depict exemplary electroadhesive pads suitable for use with exemplary embodiments described herein. Electroadhesion is an electrically controlled, astrictive adhesion technology used in applications such as gripping that often require reversible, adhesive-free binding to a substrate. Electroadhesion works by creating electrostatic forces between an electroadhesive pad and a substrate that is either electrically insulating or conductive.

Augmenting the grip strength may be accomplished by actuating the electroadhesive pad(s) to attract (pull) a gripped object at select locations, repel (push) the gripped object at select locations, or to selectively attract and repel the object at different points. The electroadhesive pads may either improve or intentionally loosen the grip on the object by the actuator(s).

As shown in FIG. 29A, an exemplary electroadhesive pad may include two interdigitated electrodes patterned on the surface of a dielectric material. The pad may be fabricated as a flexible or stretchable electronic using a variety of methods, such as inkjet printing, stencil printing, lithographic patterning of thermally evaporated metals, lithographic patterning of sputter coated metals, or laser sintering of metal particles.

FIG. 29B depicts an example of such an electroadhesive pad embedded in a soft actuator. As described above, the soft actuator may have an extensible pneumatic layer and a less extensible layer. In the embodiment of FIG. 29B, the electroadhesive pad is embedded in the less extensible layer of the actuator.

FIG. 29C shows what occurs when the interdigitated electrode is charged. Fringe field lines are created between the positive and negative electrodes that extend in the direction normal to the electrode pattern. When the electroadhesive pad is brought in proximity to a substrate (e.g., glass, drywall, wood, concrete, metals, etc.), its fringe field lines penetrate the substrate and redistribute charge to create a pattern of opposite polarity in the substrate. The coulombic attraction between the charges on the electrode and the complementary, induced charges on the surface of the substrate creates an electrostatic force that can be used to adhere the electroadhesive pad to the substrate. Controlling of the electrostatic adhesion voltage permits the adhesion to be turned on and off easily.

Turning next to FIGS. 30A-30F, reinforced actuators for preventing bowing in a strain limiting layer are now described. The strain limiting layer of a soft actuator can have the tendency to bow away from the neutral bending plane of the actuator during inflation. This bowing of the strain limiting layer increases the second moment of area of the actuators cross section thereby increasing the actuators resistance to bending. This behavior diminishes the function of the actuator.

This problem can be mitigated by overmolding rigid elements (e.g. plastics, metals, ceramics, or stiffer elastomers) in to the strain limiting layer. This is accomplished by placing a plurality of rigid elements into the strain limiting layer where the long axis of each element is oriented perpendicular to the neutral axis of bending. This orientation allows the rigid elements to prevent bowing of the strain limiting layer in the direction perpendicular to the neutral axis but only minimally impedes bending along the neutral axis.

Figure 30A:
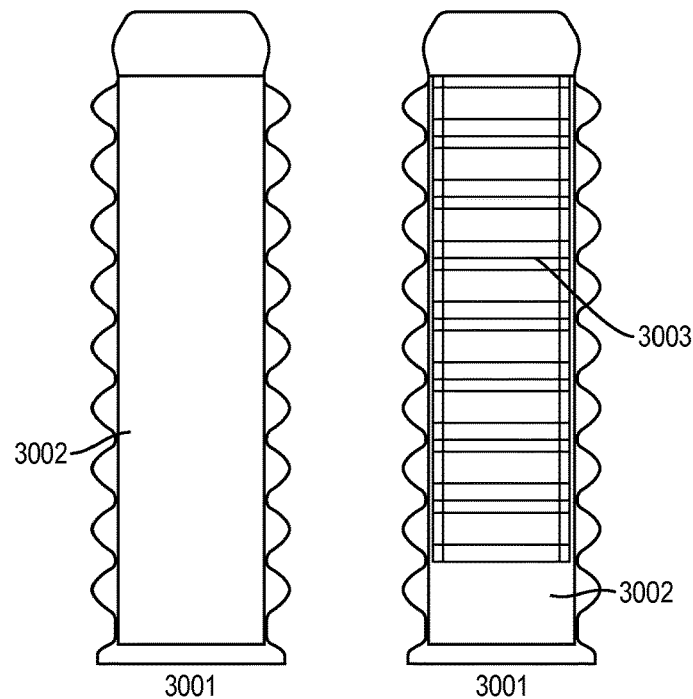
FIGS. 30A-30F depict exemplary reinforcement structures for reinforcing a soft actuator.
Figure 30B:
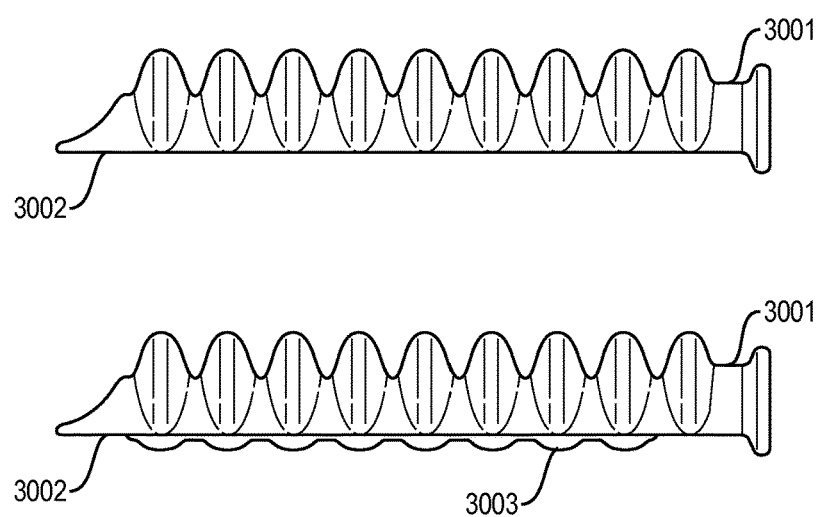

The rigid elements may be held in place between the strain limiting layer of the soft actuator body and an overmolded encapsulating elastomer layer. FIG. 30A depicts side-by-side bottom views of a soft actuator body 3001 without an encapsulating elastomer layer on the strain limiting layer 3002 (left), and the same soft actuator body having an encapsulating elastomer layer 3003 (right). The encapsulating elastomer layer 3003 may be made of the same materials as the soft actuator body (e.g., the same elastomer materials), or may be made of a relatively more rigid material. FIG. 30B are side-by-side side views of the soft actuator body 3001 with and without the encapsulating elastomer layer 3003 on the strain limiting layer 3002 (top and bottom, respectively).

In some embodiments, the encapsulating elastomer layer 3003 may overlay reinforcing slats 3004 in order to prevent bowing in the strain limiting layer 3002. The soft actuator body 3001 may be provided with molded trenches 3005 for receiving the reinforcing slats 3004. Alternatively or in addition, the molded trenches 3005 may be located in the encapsulating elastomer layer 3003, or trenches 3005 may be located both in the soft actuator body 3001 and the encapsulating elastomer layer 3003. In assembly, the reinforcing slats may be slotted into the trenches 3005 and overlaid with the encapsulating elastomer layer 3003. The slats 3004 may be made of a relatively rigid material or materials as compared to the soft actuator body 3001, such as plastics, metals, ceramics, or stiffer elastomers.

Figure 30C:
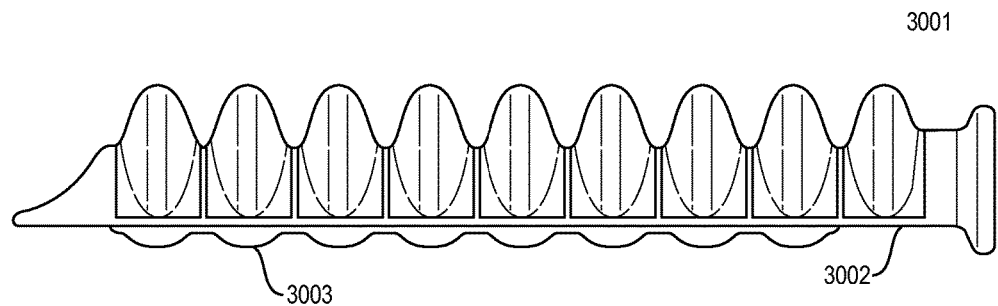
Figure 30D:
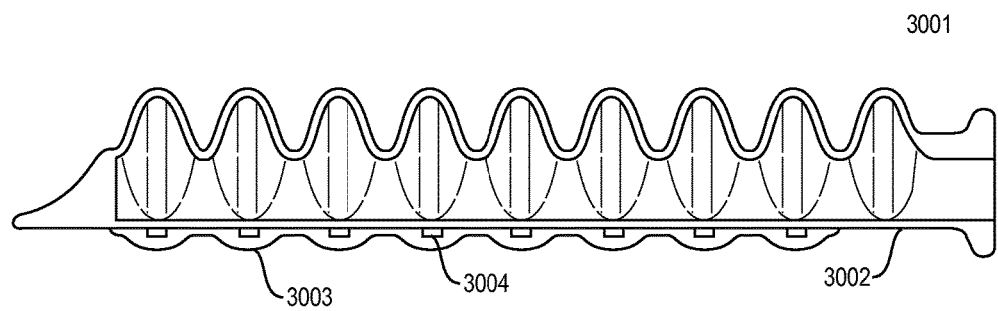
Figure 30E:
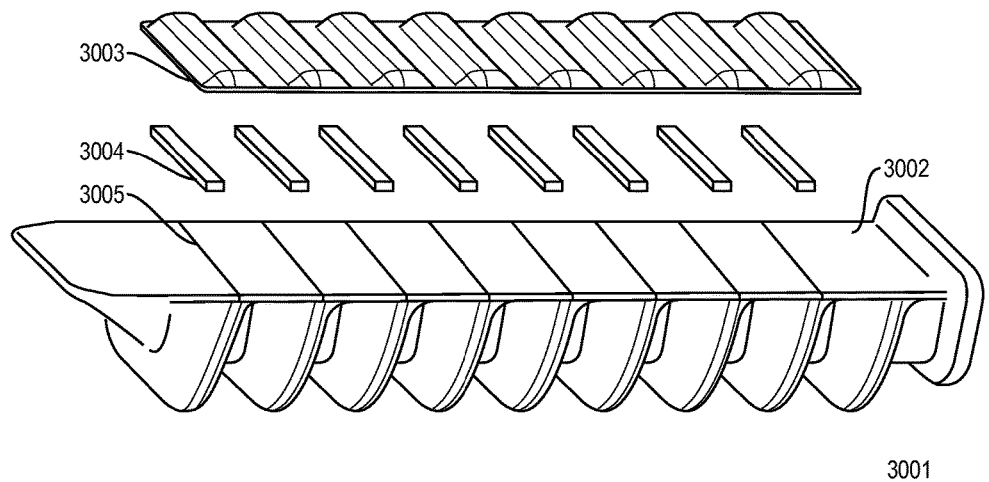

FIG. 30C depicts the side of the soft actuator body 3001 having an encapsulating elastomer layer 3003, and FIG. 30D is a cross-sectional view of the actuator depicted in FIG. 30C, showing the location of the rigid slats 3004. FIG. 30E is an exploded view showing the rigid slats 3004 between the strain limiting layer 3002 and the encapsulating elastomer layer 3003.

Figure 30F:
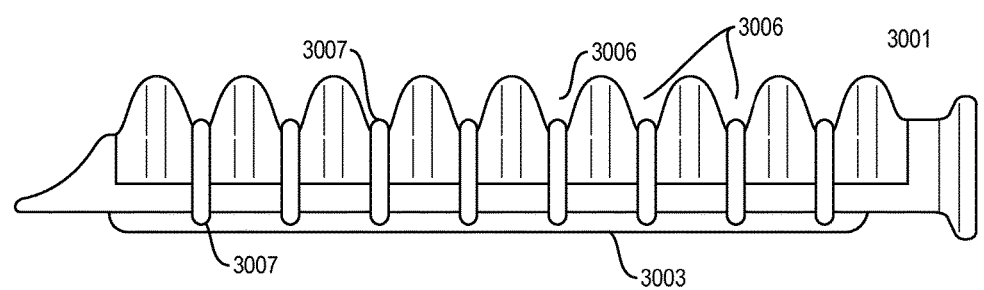

FIG. 30F depicts an example of a soft actuator body 3001 having an encapsulating elastomer layer 3003, and furthermore having overmolded rigid or elastomeric structures 3007 for reinforcing the accordion troughs 3006 of the soft actuator bladder. The structures 3007 serve to minimize or reduce strain at the accordion troughs 3006. The pressure of inflation of the soft actuator body 3001 may cause the troughs 3006 of an accordion-shaped soft actuator to strain. This generates points of stress concentration in the troughs 3006 which at elevated pressure can lead to the failure of the actuator. Nonetheless, elevating the inflation pressure of an actuator is desirable since this increases the force that can be delivered by the actuator when it is used as part of a gripper or the rigidity of the actuator when it is used as a structural element in an application. As a result it is desirable to reinforce these troughs with rigid materials (e.g. plastics, metals, ceramics, or stiffer elastomers) in order to minimize the straining of the actuator at these points when it is operated at elevated pressures.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the present invention has been disclosed with reference to certain embodiments, numerous modifications, alterations and changes to the described embodiments are possible without departing from the sphere and scope of the present invention, as defined in the appended claim(s). Accordingly, it is intended that the present invention not be limited to the described embodiments, but that it has the full scope defined by the language of the following claims, and equivalents thereof.

The invention claimed is:

1. A soft robotic hub assembly comprising:
   a master side assembly to be coupled to a mechanical robotic component;
   a tool side assembly configured to be releasably coupled to the master side assembly; and
   two or more soft actuators in at least two different sizes coupled to the tool side assembly, the two or more soft actuators configured to transition from an unactuated configuration to an actuated configuration independently of one another upon application of an inflating fluid to the soft actuator.

2. The hub assembly of claim 1, further comprising an interface configured to releaseably couple the master side assembly to the tool side assembly, wherein the interface provides a seal for an inflation line connection that is configured to inflate the two or more soft actuators.

3. The hub assembly of claim 2, wherein the interface comprises a series of pegs and slots, the pegs being configured to rotatably lock into the slots.

4. The hub assembly of claim 2, wherein the interface comprises a geometric recess and a corresponding geometric stepped portion configured to interlock.

5. The hub assembly of claim 2, wherein the interface comprises one or more electrostatic adhesion pads.

6. The hub assembly of claim 1, wherein the tool side assembly is a first tool side assembly and the two or more soft actuators are a first set of two or more soft actuators, further comprising:
   a second tool side assembly coupled to a second set of one or more soft actuators, the second set of one or more soft actuators being deployed in a different configuration from the first set of two or more soft actuators, wherein
   the first tool side assembly is configured to be replaceable with the second tool side assembly.

7. The hub assembly of claim 1, wherein the tool side assembly comprises one or more electrical signal lines configured to be in electrical communication with one or more electrical signal lines in the master side assembly when the tool side assembly and the master side assembly are coupled together.

8. The hub assembly of claim 1, wherein the hub assembly is configured to adjust an angle of the actuators.

9. The hub assembly of claim 2, wherein the interface comprises a magnetic interface.

* * * * *